(12) United States Patent
Usami

(10) Patent No.: US 7,911,918 B2
(45) Date of Patent: Mar. 22, 2011

(54) OPTICAL RECORDING METHOD, OPTICAL RECORDING APPARATUS, OPTICAL RECORDING MEDIUM, AND OPTICAL RECORDING AND REPRODUCING METHOD BY USE OF HOLOGRAPHY

(75) Inventor: Yoshihisa Usami, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 484 days.

(21) Appl. No.: 12/063,471

(22) PCT Filed: Jul. 25, 2006

(86) PCT No.: PCT/JP2006/314658
§ 371 (c)(1),
(2), (4) Date: Feb. 11, 2008

(87) PCT Pub. No.: WO2007/026483
PCT Pub. Date: Mar. 8, 2007

(65) Prior Publication Data
US 2009/0103415 A1 Apr. 23, 2009

(30) Foreign Application Priority Data
Aug. 30, 2005 (JP) .................................. 2005-250336

(51) Int. Cl.
*G11B 7/00* (2006.01)
(52) U.S. Cl. .................................... 369/103; 369/44.29
(58) Field of Classification Search .................. None
See application file for complete search history.

(56) References Cited

U.S. PATENT DOCUMENTS

| 2004/0001400 A1* | 1/2004 | Amble et al. ............... 369/44.26 |
| 2004/0184382 A1* | 9/2004 | Horimai et al. ................ 369/103 |
| 2004/0263931 A1 | 12/2004 | Yoshihiro |

(Continued)

FOREIGN PATENT DOCUMENTS
EP    1562185 A    8/2005
(Continued)

OTHER PUBLICATIONS

Hideyoshi Horimai et al Collinear Holography, Applied Optics, OSA, Optical Society of America, Washington, DC, vol. 44, No. 13, May 1, 2005 pp. 2575-2579, XP007901854.

*Primary Examiner* — Paul Huber
(74) *Attorney, Agent, or Firm* — Sughrue Mion, PLLC

(57) ABSTRACT

The present invention aims to provide an optical recording method etc. that provides higher efficiency of recording and reproducing and is uninfluenced by the mismatch of optical axes of plural laser lights induced from accident errors of optical recording and optical reproducing apparatuses when carrying out recording or reproducing, or focus control etc. by use of a laser light, high multiple-recording can be carried out, and layer construction of the recording medium itself is simple.

For the purpose, an optical recording method etc. is provided that comprises a first step of recording an interference image, in which a recording light is irradiated at an optional focusing length X1 in thickness direction of the recording layer, an interference image is formed, and the interference image is formed on the recording layer, then multiple bits are recorded per one recording, and a second step of recording an interference image, in which the recording light is irradiated at a focusing length X2 that is different from the focusing length X1 to form a second interference image, and the second interference image is formed and recorded on the recording layer, and then multiple bits are recorded per one recording.

9 Claims, 9 Drawing Sheets

U.S. PATENT DOCUMENTS

| | | |
|---|---|---|
| 2005/0002311 A1 | 1/2005 | Katsutaro et al. |
| 2005/0088947 A1 | 4/2005 | Katsutaro et al. |

FOREIGN PATENT DOCUMENTS

| | | |
|---|---|---|
| JP | 11-126335 A | 5/1999 |
| JP | 2002-123949 A | 4/2002 |
| JP | 2003-228875 A | 8/2003 |
| JP | 2004-265472 A | 9/2004 |
| JP | 2006-106734 A | 4/2006 |
| WO | 2007/026483 A1 | 3/2007 |

* cited by examiner

Optical Recording Medium  Circumferential Direction

Optical Recording Medium Circumferential Direction

Optical Recording Medium Circumferential Direction

OPTICAL RECORDING METHOD, OPTICAL RECORDING APPARATUS, OPTICAL RECORDING MEDIUM, AND OPTICAL RECORDING AND REPRODUCING METHOD BY USE OF HOLOGRAPHY

This application is a 371 of PCT/JP2006/314658, filed Jul. 25, 2006.

TECHNICAL FIELD

The present invention relates to optical recording methods, optical recording apparatuses, and optical recording media to record information by use of holography, particularly to optical recording methods, optical recording apparatuses, and optical recording media that can perform high multiple-recording, in which an informing light and a reference light for use in recording are irradiated to an optical recording medium, which is provided with a hologram memory of which the recording layer is recorded with focus point information such as track information, address information, and focusing length information, a diffracted light is detected, and focus control and/or tracking control is carried out.

BACKGROUND ART

In optical recording methods to record information on optical recording media by use of holography, the recording is typically carried out by way of causing interference between an informing light of substance light, having image information, and a reference light and writing the interference fringes on the optical recording media. The optical recording method is exemplified by those of Collinear system in which the informing light and the reference light are irradiated as a coaxial light beam. In the Collinear system, the interference fringes are formed by the informing light and the reference light to record image information etc. on the recording layer. Reproduction of the recorded image information etc. is carried out by way of irradiating the light same with the reference light to the recording medium from the same direction with that at recording, i.e. the light irradiation forms a diffracted light from the interference fringes and the information is reproduced though receiving the diffracted light.

When recording or reproducing the image information, the focus points are controlled in terms of the light beam irradiation, by way of focus control or tracking control, in order to adjust interlayer distances of recording layers in optical recording media and accident errors of optical recording and optical reproducing apparatuses and to record the information at normal positions of the optical recording media.

The method to control the focus points is exemplified by those of sampled servo system, in which a servo light is irradiated to the optical recording media for the focus control or the tracking control and the position information like focus information or track information is detected from the reflected light for the light irradiation. On the basis of the control of the focus points, the informing light and the reference light are irradiated at the normal positions of the optical recording media thereby the recording and the reproduction can be carried out (Patent Literatures 1 to 3).

The sampled servo system is exemplified specifically by the optical recording apparatus shown in FIG. 10. In the optical recording apparatus, a red light is used as the servo light, and laser lights of green etc. having a wavelength different from that of the servo light are used for the informing light and the reference light for recording.

The servo light, which being reflected at a dichroic mirror 13, passes through an objective lens 12, and irradiates an optical recording medium 21 so as to focus on the reflective film 2. The dichroic mirror 13 transmits the lights of green and blue wavelengths and reflects the light of red wavelengths. The servo light incident from a light entrance/exit surface A of the optical recording medium 21 is reflected by the reflective film 2 to emit again from the light entrance/exit surface A. The emitted return light passes through the objective lens 12 and is reflected by the dichroic mirror 13, and then a servo information detector (not shown) detects servo information. The detected servo information is used for the focus servo, tracking servo, slide servo and the like. The recording layer 4 is designed so as to be insensitive to red light.

The informing light and the reference light irradiate the optical recording medium 21 such that the informing light and the reference light, which being controlled into an appropriate position by the servo, transmit through a polarizing element 16, a half mirror 17, and the dichroic mirror 13 and form an interference image within an recording layer 4 by the objective lens 12. When the informing light and the reference light enter from the light entrance/exit surface A, they interact with each other at the recording layer 4 to form and record an interference image there, then transmit through the recording layer 4 and enter into a filter layer 6, and then, are reflected to turn into a return light before the bottom of the filter layer 6 without reaching the reflective film 2. The filter layer 6, which being a laminate of four layers of cholesteric liquid crystal, is designed to exclusively transmit red light.

In cases of optical recording apparatuses on the basis of the sampled servo system, however, only position information for light irradiation such as focus information and track information is detected in relation to the servo light, and the positions to irradiate the informing light and the reference light to the recording layer are controlled based on the results. Therefore, there arises such a problem that the reproduction is incorrect when there exists an accident error between the optical axis of the servo light and the optical axes of the informing light and the reference light, and also the optical recording apparatus for recording and the optical recording apparatus for reproducing are different each other. It may be possible to employ the sampled servo system for the informing light and the reference light in addition to the servo light in order to attain correct reproduction. When the sampled servo system is employed for the servo light as well as the informing light and the reference light in addition, however, there arises such a problem that the efficiency of recording/reproducing is lowered such as being inadequate for speeding up of the recording/reproducing. Since plural laser lights different each other are irradiated through different routes, it is necessary that layers such as wavelength selective reflective layers are laminated on the optical recording media depending on the respective laser lights, which leading to a problem of complicated layer construction.

Furthermore, recording capacity is limited in optical recording methods in which the recording light is moved on one plane horizontal to layer plane of the recording layer of the optical recording media to perform multiple-recording on the one plane.

Accordingly, such an optical recording method, an optical recording apparatus, and an optical recording medium have not been achieved yet that are excellent in providing higher efficiency of recording/reproducing and being uninfluenced by the mismatch of optical axes of plural laser lights induced from accident errors of optical recording and optical reproducing apparatuses when carrying out recording/reproducing or control of focus or tracking by use of a laser light, high multiple-recording can be performed, and also layer construction of the recording medium itself is simple, and their provisions are demanded currently.

Patent Literature 1: Japanese Patent Application Laid-Open (JP-A) No. 2002-123949

Patent Literature 2: JP-A No. 2004-265472

Patent Literature 3: JP-A No. 2003-228875

The present invention aims to solve the problems in the art described above and to attain the objects described below. That is, it is an object of the present invention to provide an optical recording method, an optical recording apparatus, and an optical recording medium that are excellent in higher efficiency of recording/reproducing and being uninfluenced by the mismatch of optical axes of plural laser lights induced from accident errors of optical recording and optical reproducing apparatuses when carrying out recording/reproducing or control of focus or tracking by use of a laser light, high multiple-recording can be performed, and also layer construction of the recording medium itself is simple.

DISCLOSURE OF INVENTION

The problems described above can be solved by the present invention as follows:

<1> An optical recording method, comprising a first step of recording an interference image, in which a recording light is irradiated to an optical recording medium that is provided with a recording layer to record information by use of holography, an interference image is formed, and the interference image is formed on the recording layer, wherein the recording light is irradiated at an optional focusing length X1 in thickness direction of the recording layer, and multiple bits are recorded per one recording, and a second step of recording an interference image, in which the recording light is irradiated to form a second interference image, and the second interference image is formed and recorded on the recording layer, wherein the recording light is irradiated at a focusing length X2 that is different from the focusing length X1, and multiple bits are recorded per one recording.

<2> The optical recording method according to <1>, wherein the focusing length X1 is a distance at which the interference image is formed at interface of the recording layer, and the focusing length X2 is a distance at which the interference image is formed at a position other than the interface.

<3> The optical recording method according to <1> or <2>, wherein the optical recording medium comprises at least two hologram memories, which record focus position information with an interval in thickness direction of the recording layer, and the focus position information comprises at least one of track information, address information, and focusing length information that expresses a distance between a collecting lens and the focus point of the recording light, wherein the optical recording method comprises a first servo step, in which the recording light is irradiated to a first hologram memory among the at least two hologram memories, the diffracted light from the first hologram memory is received, the recording light is subjected to tracking servo on the basis of the track information and the address information, and the recording light is subjected to focus servo on the basis of the focusing length information; a first step of recording the interference image, in which the focus position of the recording light is displaced horizontally in parallel with layer plane of the recording layer and within the plane that contains the first hologram memory so as to place the focus position of the recording light to a position other than the first hologram memory, the recording light is irradiated to the recording layer to form the first interference image, and the first interference image is recorded on the recording layer; a second servo step, in which the recording light is irradiated to a second hologram memory, which records with an interval between the first hologram memory in thickness direction of the recording layer, the diffracted light from the second hologram memory is received, the recording light is subjected to tracking servo on the basis of at least one of the track information and the address information, and the recording light is subjected to focus servo on the basis of the focusing length information; and a second step of recording the interference image, in which the focus position of the recording light is displaced horizontally in parallel with layer plane of the recording layer and within the plane that contains the second hologram memory so as to place the focus position of the recording light to a position other than the second hologram memory, the recording light is irradiated to the recording layer to form the second interference image, and the second interference image is recorded on the recording layer.

<4> The optical recording method according to <3>, wherein the method to detect the focus position in at least one of the first servo step and the second servo step comprises irradiating the recording light to the hologram memory, receiving the diffracted light, and detecting the position at which signal intensity of the diffracted light is maximum.

<5> The optical recording method according to <3> or <4>, wherein the method to detect the focus position in at least one of the first servo step and the second servo step comprises irradiating the recording light to the hologram memory, receiving the diffracted light, and detecting the position at which signal error of the diffracted light is minimum.

<6> The optical recording method according to any one of <1> to <5>, wherein the recording light is at least one of the informing light and the reference light, and the informing light and the reference light are irradiated to the optical recording medium in a way that the optical axis of the informing light and the optical axis of the reference light are coaxial.

In the optical recording method according to <6>, the recording light is at least one of the informing light and the reference light, and the informing light and the reference light are irradiated to the optical recording medium in a way that their axes are coaxial, therefore, the recording and reproducing can be carried out with stable quality and significantly less distortion of reproduced images due to mismatch of the optical axes. The term "coaxial" means that the informing light and the reference light pass through an identical optical system. The informing light and the reference light are irradiated at a recording portion of the recording layer of the optical recording medium with a certain angle thereby to carry out hologram recording.

<7> The optical recording method according to any one of <1> to <6>, wherein the optical recording medium comprises a first substrate, a recording layer, and a second substrate in this order.

<8> The optical recording method according to <7>, wherein a reflective film is provided at the surface of the second substrate.

<9> The optical recording method according to <8>, wherein the reflective film is a reflective film formed of metal.

<10> The optical recording method according to any one of <1> to <9>, wherein the optical recording medium is a reflective-type hologram.

<11> An optical recording apparatus, comprising a first unit configured to record an interference image, in which a recording light is irradiated to an optical recording medium that is provided with a recording layer to record information by use of holography, an interference image is formed, and the interference image is formed on the recording layer, wherein the recording light is irradiated at an optional focusing length X1 in thickness direction of the recording layer, and multiple bits are recorded per one recording, and a second unit configured to record an interference image, in which the recording light is irradiated to form a second interference image, and the second interference image is formed and recorded on the recording layer, wherein the recording light is irradiated at a focusing length X2 that is different from the focusing length X1, and multiple bits are recorded per one recording.

<12> The optical recording apparatus according to <11>, wherein the focusing length X1 is a distance at which the interference image is formed at interface of the recording layer, and the focusing length X2 is a distance at which the interference image is formed at a position other than the interface.

<13> The optical recording apparatus according to <11> or <12>, wherein the optical recording medium comprises at least two hologram memories, which record focus position information with an interval in thickness direction of the recording layer, and the focus position information comprises at least one of track information, address information, and focusing length information that expresses a distance between a collecting lens and the focus point of the recording light, wherein the optical recording apparatus comprises a first servo unit, in which the recording light is irradiated to a first hologram memory among the at least two hologram memories, the diffracted light from the first hologram memory is received, the recording light is subjected to tracking servo on the basis of at least one of the track information and the address information, and the recording light is subjected to focus servo on the basis of the focusing length information; a first unit configured to record the interference image, in which the focus position of the recording light is displaced horizontally in parallel with layer plane of the recording layer and within the plane that contains the first hologram memory so as to place the focus position of the recording light to a position other than the first hologram memory, the recording light is irradiated to the recording layer to form the first interference image, and the first interference image is recorded on the recording layer; a second servo unit, in which the recording light is irradiated to a second hologram memory, which records with an interval between the first hologram memory in thickness direction of the recording layer, the diffracted light from the second hologram memory is received, the recording light is subjected to tracking servo on the basis of the track information and the address information, and the recording light is subjected to focus servo on the basis of the focusing length information; and a second unit configured to record the interference image, in which the focus position of the recording light is displaced horizontally in parallel with layer plane of the recording layer and within the plane that contains the second hologram memory so as to place the focus position of the recording light to a position other than the second hologram memory, the recording light is irradiated to the recording layer to form the second interference image, and the second interference image is recorded on the recording layer.

<14> An optical recording medium, recorded by the optical recording method according to any one of <1> to <10>.

<15> The optical recording medium according to <14>, comprising at least two hologram memories that record focus position information on the recording layer with an interval in thickness direction of the recording layer, and the focus position information contains at least one of track information, address information, and focusing length information that expresses a distance between a collecting lens and the focus point of the recording light.

<16> An optical recording and reproducing method, comprising irradiating a reference light to the interference image, formed on the recording layer by the optical recording method according to any one of <1> to <10>, and reproducing the recorded information that corresponds to the interference image.

<17> The optical recording and reproducing method according to <16>, comprising irradiating a reference light, from the same angle of the reference light at recording on the optical recording medium, to the interference image to reproduce the recorded information.

The present invention can solve the problems in the art, that is, the present invention can advantageously provide an optical recording method, an optical recording apparatus, and an optical recording medium that can record or reproduce information or perform focus or tracking control by use of a laser light at higher efficiency of recording and reproducing without being influenced by the deviation of optical axes of plural laser lights induced from accident errors of optical recording and optical reproducing apparatuses, high multiple-recording can be carried out, and also the layer construction of optical recording media themselves is simple.

BEST MODE FOR CARRYING OUT THE INVENTION

Optical Recording Method and Optical Recording Apparatus

The inventive optical recording method comprises a first step of recording an interference image, in which a recording light is irradiated to an optical recording medium that is provided with a recording layer to record information by use of holography, an interference image is formed, and the interference image is formed on the recording layer, wherein the recording light is irradiated at an optional focusing length X1 in thickness direction of the recording layer, and multiple bits are recorded per one recording, a second step of recording an interference image, in which the recording light is irradiated to form a second interference image, and the second interference image is formed and recorded on the recording layer, wherein the recording light is irradiated at a focusing length X2 that is different from the focusing length X1, and multiple bits are recorded per one recording, and the other optional steps selected properly as required.

Specifically, the optical recording method comprises the first servo step and the first step of recording the interference image at the focusing length X1 and then the second servo step and the second step of recording the interference image at the focusing length X2, and optionally, the third servo step and the third step of recording the interference image at the focusing length X3, the nth servo step and the nth step of recording the interference image at the focusing length Xn, and the other optional steps selected properly as required.

The inventive optical recording method, which can be carried out by the inventive optical recording apparatus, will be apparent through the explanations of the inventive optical recording apparatus.

The first and the second servo steps (or the first to the nth servo steps) of the inventive optical recording method can be carried out by the servo units of the inventive optical recording apparatus; the first to second steps of recording an interference image (or the first to nth steps of recording an interference image) of the inventive optical recording method can be carried out by the units configured to record an interference image of the inventive optical recording apparatus; and the other steps of the inventive optical recording method can be carried out by the other units of the inventive optical recording apparatus.

Figure 1:
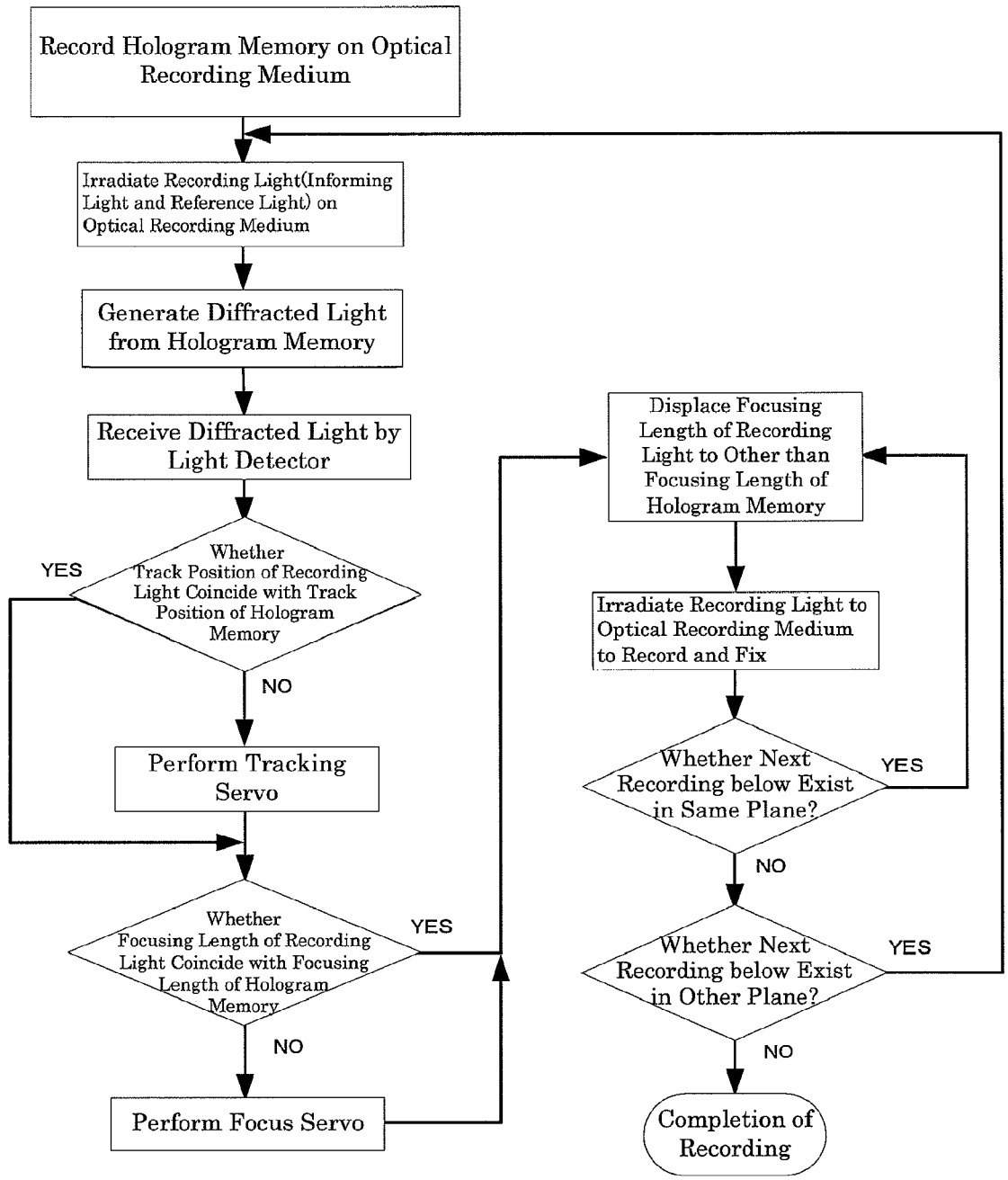
FIG. 1 is a flow chart of the inventive optical recording method.
Figure 3:
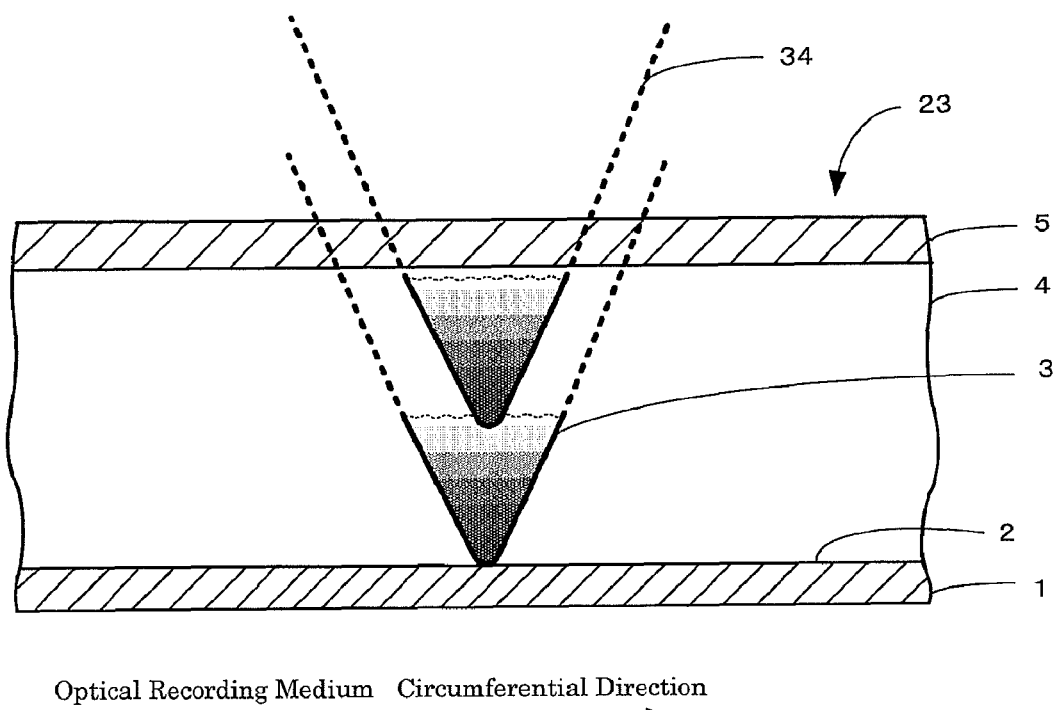
FIG. 3 is a partial cross-sectional view that shows adequate focus positions of the informing light and the reference light in accordance with the present invention.

Specifically, as shown in FIG. 3, at least two hologram memories are initially recorded in the inventive optical recording medium with an interval in thickness direction of the recording layer. As regards the recording procedures, as shown in FIG. 1, a recording light is irradiated to one of the hologram memories to generate a diffracted light from the hologram memory, the diffracted light is received by a light detector to detect whether or not the track position of the irradiated recording light coincides with the track of the hologram memory, and when not coinciding therebetween, tracking servo is carried out to coincide them. When coinciding or after coinciding, the coincidence is detected between the focusing length of the irradiated recording light and the focusing length of the hologram memory, and when not coinciding therebetween, focus servo is carried out to coincide them. When coinciding or after coinciding, the focus position of the recording light is moved horizontally to a position other than the focus position of the hologram memory. After moving, the recording light is irradiated to the optical recording medium to record and fix. When next recording is carried out at the same plane containing the hologram memory, the focus position of the recording light is further moved horizontally, and after completing all recording and fixing in the same plane, the recording light is irradiated to the next hologram memory of the optical recording medium to carry out recording on the next plane, and recording and fixing are carried out in the same manner as that of the first plane then to finish the procedures after all of recording and fixing are completed. The fixing may be carried out after each recording as described above, alternatively, the fixing may be carried out entirely after all recordings are completed.

Servo Unit

The servo unit irradiates the recording light to the optical recording medium, receives the diffracted light from the hologram memory, performs tracking servo of the recording light based on the track information and the address information, and performs focus servo of the recording light based on the focusing length information, in which the optical recording medium is equipped with the hologram memory that comprises the recording layer to record information by use of holography and records at least one of track information and address information as well as focusing length information that expresses a distance between a collecting lens and the focus point of the recording light.

The recording light is irradiated to the first hologram memory in the first servo step; the recording light is irradiated to the second hologram memory in the second servo step, the recording light is irradiated to the third hologram memory in the third servo step, and the recording light is irradiated to the nth hologram memory in the nth servo step, in which these steps can be carried out similar servo units.

Focus Position Information

The focus position information may be properly selected without particular limitations, as long as containing at least track information, address information, and focusing length information; for example, the focus position information may contain tilt information as to angles such as rotation angle and tilt angle, three-dimensional information as to steric position, information as to recording signal, focus depth, etc. The style of these information may be of image data or numerical data.

The track information may be properly selected depending on the application; examples thereof include track width, track height, pitch between tracks, track shape, location of track in optical recording media, refractive index, recording method, and order. Wobble pits may be formed on the track with a certain periodicity, or address information may be formed on track surface.

The address information is exemplified by horizontal position information at a flat plane of layer plane of the recording layer, area information such as data area and recording area, and flame information.

The horizontal position information may be encoded position information such as of 0000, 0001, 0002; position information (a, b, c) in which an optional address in the optical recording medium is defined as the original point and X, Y, Z axes are defined within the recording layer and the horizontal layer plane, and "a", "b", "c" represent a distance from the X, Y, and Z axes respectively; and accessible position information that can define a specific position even with no relation to actual sites.

The horizontal position information is basic information to control the irradiation sites of the informing light as the recording light and the reference light, therefore, the positional accuracy is required to be very high; preferably, the positional error of points of "a", "b", and "c" is within ±10 µm, more preferably within ±1 µm. As regards within ±10 µm, the control of irradiating positions may be non-problematic for the informing light and the reference light when being within ±10 µm, and when higher accuracy beyond 100 µm is demanded, the productivity may be lowered. The horizontal position information, which being recorded in production processes of optical recording media, is hence subjected to calibration control by recording devices, and the positional accuracy is very high for stable quality.

Recording Site of Hologram Memory

The recording site of the hologram memory may be properly selected without particular limitations as long as being within the recording layer; the recording site may be at interface with the substrate surface in the recording layer, a part or all of the recording layer in the thickness direction, a part of the recording layer in horizontal direction to layer plane, a portion of certain depth in the recording layer, or a portion of certain depth from reflective layer.

Recording Number of Hologram Memory

Figure 2:
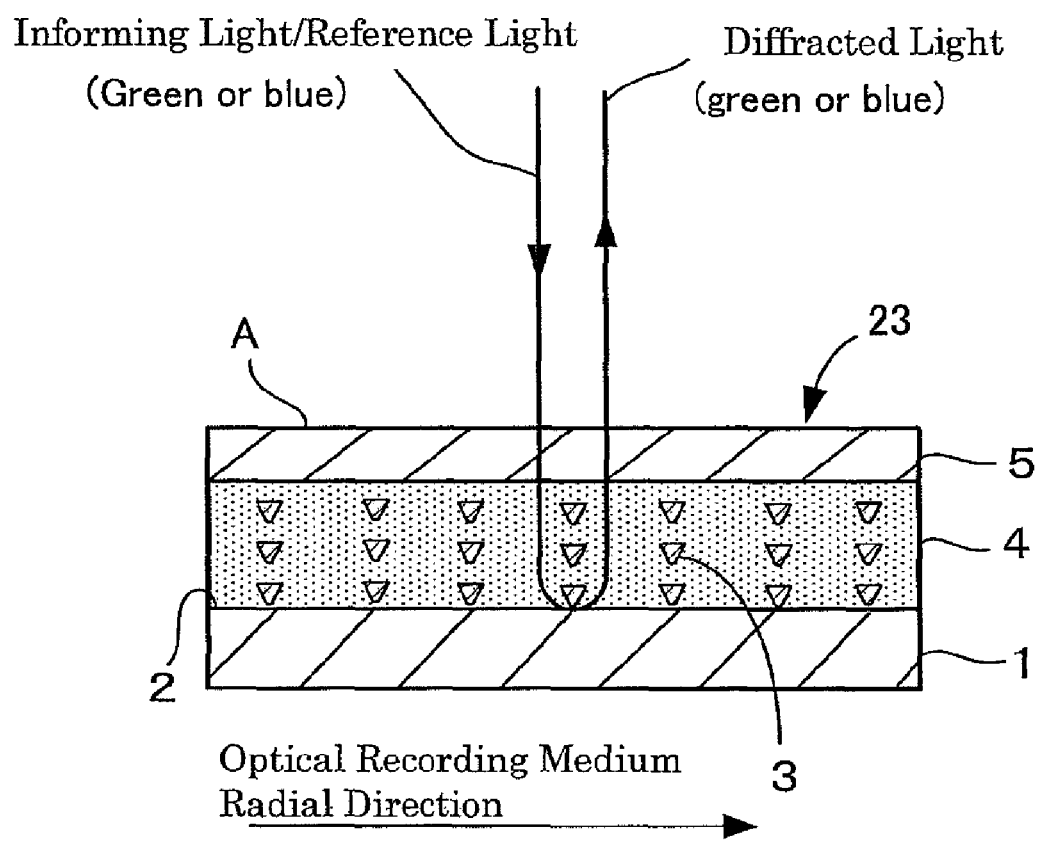
FIG. 2 is a partial cross-sectional view of the inventive optical recording medium that has a hologram memory.
Figure 4:
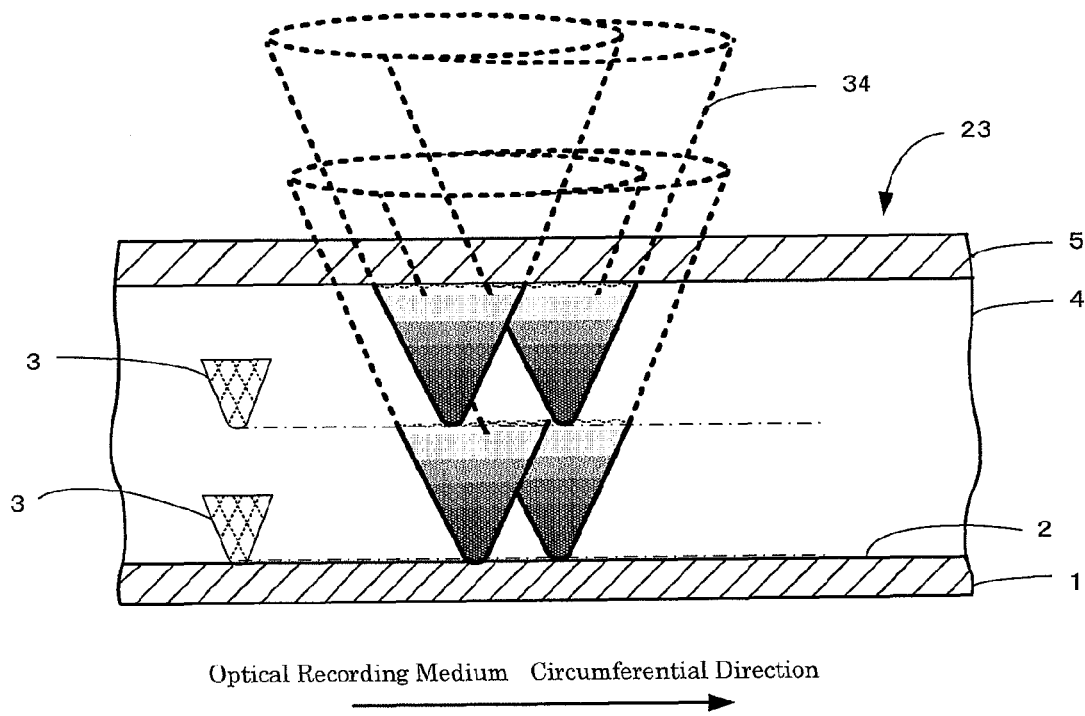
FIG. 4 is a conceptual view that shows a deviation distance between focus positions of the informing light and the reference light and an adequate focus position recorded on a hologram memory.
Figure 5:
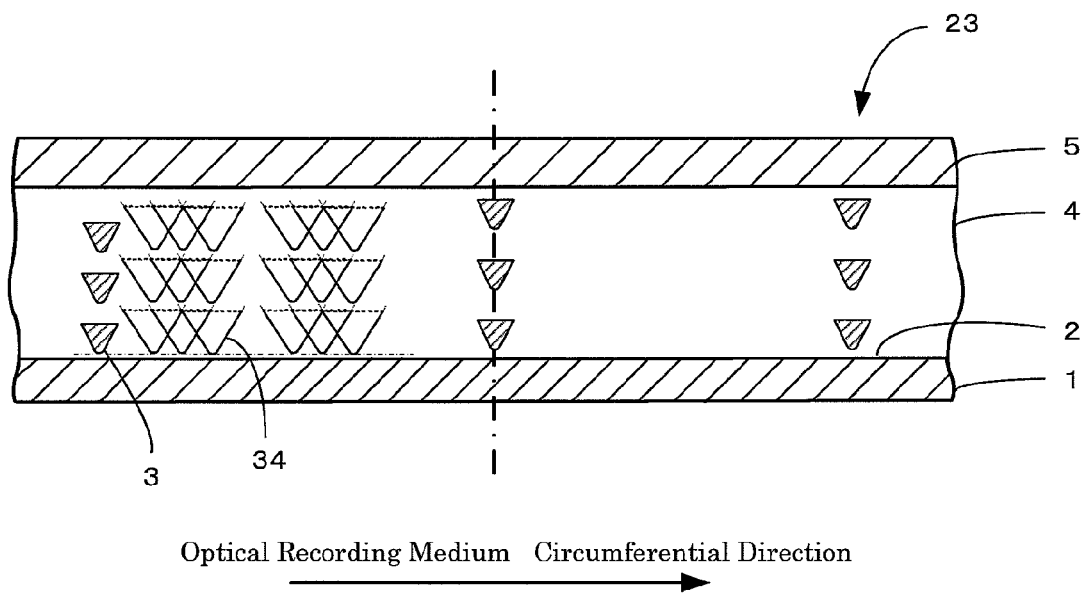
FIG. 5 is a partial cross-sectional view that shows offset amounts of focus positions of the informing light and the reference light in accordance with the present invention.
Figure 6:
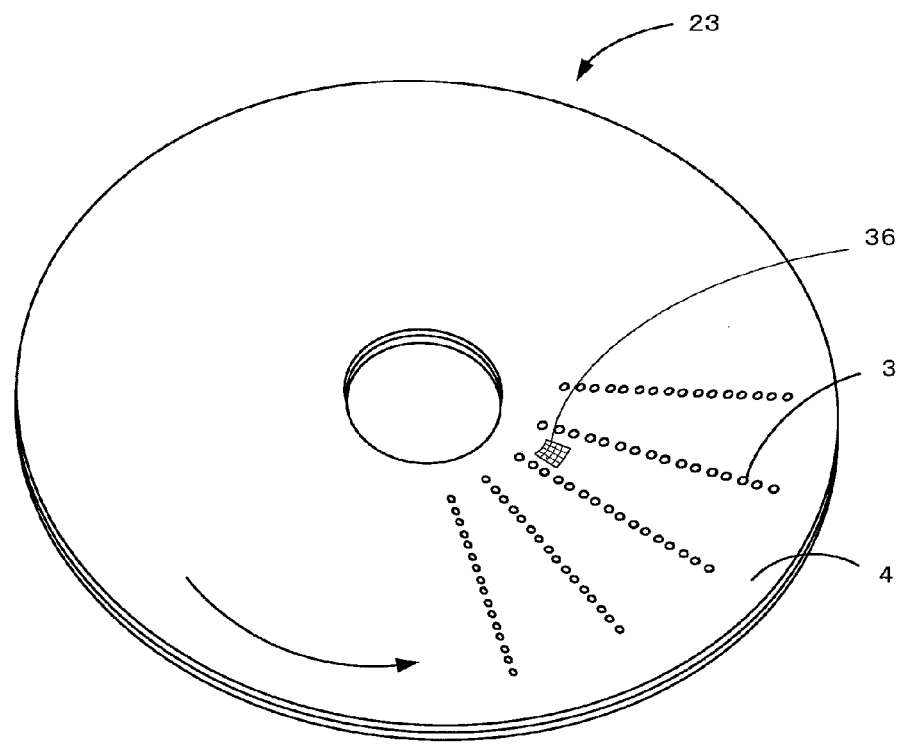
FIG. 6 is a perspective view that shows hologram memories disposed in the inventive optical recording medium.
Figure 7:
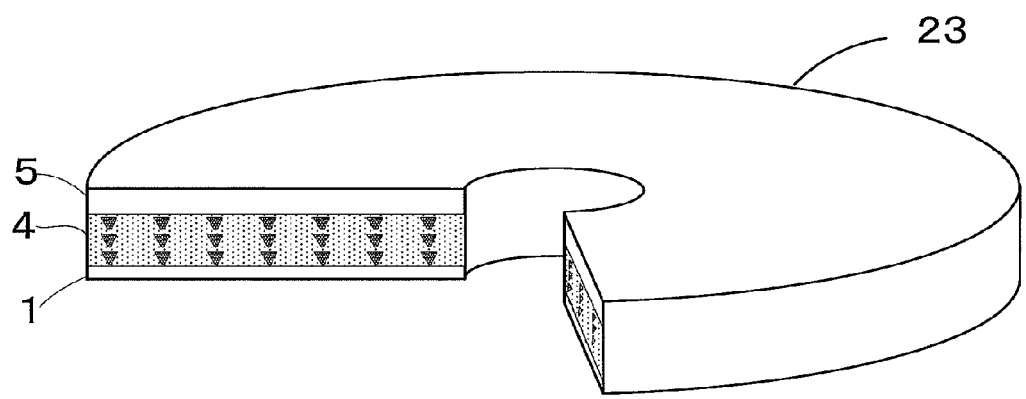
FIG. 7 is a partial cross-sectional view that shows hologram memories disposed in the inventive optical recording medium.

The recording number of the hologram memory may be properly selected without particular limitations as long as being at least two with an interval in thickness direction of the recording layer of the optical recording medium, as shown in FIGS. 2, 4 and 5; preferably, the recording number is 3 to 10, more preferably 3 to 100. Plural hologram memories may be disposed in radial direction of the recording layer at even intervals, and also may be disposed in circumferential direction as shown in FIG. 6 like a track for tracking servo; in these cases, the recording number in radial direction may be 3 to 10, preferably 3 to 100, more preferably 3 to 1,000. The recording number in circumferential direction may also be 3 to 10, preferably 3 to 100, more preferably 3 to 1,000. When the recording number is above 1,000 in these cases, production efficiency for forming the hologram memories may decrease, and the recording number of 1,000 is sufficient to detect position information from the hologram memories. FIG. 7 is a partial cross-sectional view of an optical recording medium that shows exemplarily hologram memories disposed in radial direction disposed at even intervals as well as in thickness direction of the recording layer at a number of three.

Method for Forming Hologram Memory

The method for forming the hologram memory may be properly selected depending on the application; for example, the recording layer can be recorded and fixed as the hologram memory; in addition, batch transfer methods from master hologram may be available.

Method for Recording Hologram Memory

The method for recording the hologram memory may be properly selected depending on the application; for example, the informing light and the reference light are irradiated to the recording layer, an interference fringe is formed at a part of the recording layer by optical interference between the informing light and the reference light, address information and track information of numerical data or image data are formed into an image within the recording layer as an interference image of an interference fringe, and the interference image is recorded by the unit to record an interference image and fixed by the unit to fix an interference image as described later, thereby the hologram memory can be recorded on the optical recording medium. A plurality of hologram memories can be recorded by repeating the recording and the fixing described above.

Method to Detect Deviation of Recording Light for Servo

The method to detect the deviation may be properly selected depending on the application; for example, the recording light (hereinafter sometimes referred to as "reproduction light") is irradiated to the hologram memory recorded in the optical recording medium, and the diffracted light generating from the hologram memory is received by a light detector to detect whether the focusing position and the horizontal position of the recording light coincide with the focusing position and the horizontal position recorded in the hologram memory. In coinciding cases of just-pint, the recording light is normal and the deviation is detected to be zero between the focus position and horizontal position recorded in the hologram memory and the recording light. In non-coinciding cases of non-just pint, the horizontal position of the recording light and the focus position in thickness direction of the recording layer are displaced till the just-pint appears.

The method to displace into the just-pint position is exemplified by moving to the direction toward which the signal intensity of diffracted light from the hologram memory comes to large, moving to the direction toward which the signal error of the diffracted comes to minimum, or tracking servo and focus servo.

In order to move to the direction toward which the signal intensity comes to large, the movement is finely adjusted till the signal intensity comes to maximum, and the position where the signal intensity being a maximum is recognized as the just-pint position then to stop the movement. The means to recognize the maximum of the signal intensity may be properly selected depending on the application; examples of the means include peak hold circuits and arithmetic processing.

In order to move to the direction toward which the signal error comes to small, the movement is finely adjusted till the signal error comes to minimum, and the position where the signal intensity being a minimum is recognized as the just-pint position then to stop the movement. The means to recognize the minimum of the signal error may be properly selected depending on the application; examples of the means include peak hold circuits and arithmetic processing.

Tracking Servo

The tracking servo may be properly selected depending on the application; for example, the tracking servo may be those to detect track positions using three beam methods, push-pull methods, or differential phase detection methods ("Compact Disc Dokuhon" by Heitaro Nakajima and Hiroshi Ogawa, 1st ed., Nov. 10, 1986, published from Ohmsha Ltd.).

Three Beam Method

In the three beam method, the deviation of irradiating position of servo light is detected from tracks formed on the detected disc; three beams of approximate circular main beam, sub-beam A, and sub-beam B are used. These beams are positioned and disposed on an approximate straight line in the order of sub-beam A, main beam, and sub-beam B at even intervals such that the circular center of the main beam irradiates the center of the track width, the circular under side of the sub-beam A contacts with the edge of the track width, and the circular upper side of the sub-beam B contacts with the edge of the track width.

When these beams irradiate the track at this placement, relatively weak light is reflected from the track surface and relatively intense light is reflected from areas other than the track surface, thus the positional deviation between the position of the three irradiated beams and the position of the track can be determined by detecting the intensity of the reflected lights.

Push-Pull Method

The push-pull method detects positional deviation of the servo light that irradiates a track formed on a disc to be detected, and uses a two-divided light detector that irradiates a beam to the track and the reflected light is detected after dividing into two parts. When the beam is irradiated at the central portion of the track width, the two-divided left and right lights are identical for light intensity, and when the beam is shifted to right or left of the width direction of tracks, the intensity of the reflected light comes to weak from the track portion, and the intensity of the reflected light comes to intense from other than tracks, thus the light intensity distribution comes to asymmetric between right and left, which enables to detect the deviation.

Differential Phase Detection Method

The differential phase detection (DPD) method detects positional deviation of the servo light that irradiates a track formed on a disc to be detected, and uses a four-divided light detector in which the two-divided light detector of the push-pull method is further divided. When a beam is irradiated at the central portion of the track width, the four-divided left and right lights are identical for light intensity, and when the beam is shifted to right or left of the width direction of tracks, the intensity of the reflected light comes to weak from the track portion, and the intensity of the reflected light comes to intense from other than tracks, thus the light intensity distribution comes to asymmetric between right and left by way of detecting the light intensity distribution for opposing corners in terms of the light intensity distribution of four regions of four-divided reflected light, which enables to detect the deviation.

Focus Servo

The focus servo may be properly selected depending on the application; for example, the focus servo may be based on focus detection using astigmatic methods, Foucault's methods, or critical angle methods ("Compact Disc Dokuhon" by Heitaro Nakajima and Hiroshi Ogawa, 1st ed., Nov. 10, 1986, published from Ohmsha Ltd.).

Astigmatic Method

In the astigmatic method, a deviation distance is detected between the recording position of a recording layer formed on a disc to be detected and the focus point of the informing light and the reference light. That is, the focusing length (distance between the center of objective lens and the focus point of the informing light and the reference light) and the variation from the center of objective lens to the recording position of the recording layer are detected. The reflected light is taken out by disposing a beam splitter etc. on a way from the light source and the objective lens in the light path of the light beam emitted from the light source to the optical recording medium to be irradiated through the objective lens, thereby the reflected light is transmitted through a cylindrical lens to provide an image. The detection can be made in a manner that when the resulting image is circular, the focusing lengths are identical; when the resulting image is a vertically long ellipse, the optical recording medium is too close to the objective lens; and when the resulting image is a horizontally long ellipse, the optical recording medium is too far from the objective lens.

In the detection, the reflected light is divided into four, and the detection is carried out by comparing the regions of opposing corners of the resulting image.

Foucault's Method

The Foucault's method has the same procedures as those of the astigmatic method described above till the reflected light is taken out by disposing a beam splitter etc. and the reflected light is transmitted through a cylindrical lens. The detection can be made in a manner that, using a prism at a portion where the reflected light transmitting through the cylindrical lens provides an image, when the resulting image is formed at the apex angle of the image, the focusing lengths are identical; when the resulting image is formed behind the apex angle, the optical recording medium is too close to the objective lens; and when the resulting image is formed before the apex angle, the optical recording medium is too far from the objective lens. The detection can be carried out in a way that one sensor is disposed to each of the reflected lights divided into two to detect the brightness of the two-divided reflective lights, and the image-forming position is detected.

Critical Angle Method

In the critical angle method, the deviation is detected between the recording position of a recording layer formed on a disc to be detected and the focus point of the informing light and the reference light. That is, the focusing length (deviation between the center of objective lens and the focus point of the informing light and the reference light) and the deviation from the center of objective lens to the recording position of the recording layer are detected. The focus point is detected in a manner that a prism is disposed on the way of the light source and the objective lens along such a light path that a light beam, emitted from the light source and, transmits the objective lens and irradiates the optical recording medium and the incident angle coincides with the critical angle (angle at which all of the incident light beams are reflected at the boundary surface) in relation to the central light beam of the incident light flux, the reflected light is taken out, and the reflected light is detected as to luminosity. When the optical recording medium is too close or too far from the objective lens, the focus point can be detected by distinguishing with respect to close or far from the porosity of plus or minus by making use of the fact that the reflected light, reflected at the prism, decreases the light intensity.

The tracking servo and the unit for the tracking servo may be properly selected depending on the application; for example, the tracking servo and the unit for tracking servo may be of servo mechanism.

The servo mechanism may be properly selected depending on the application; for example, the servo mechanism may be one to control the focusing length, in which the difference is transferred into a focus error signal, the signal is passed through a phase compensation drive amplifier to amplify the signal, and the signal commands a driving device to move the site of the objective lens.

The driving device may be properly selected depending on the application; for example, the driving device may be actuators, stepping motors, etc.

Irradiation of Recording Light (Reproduction Light) for Detection

The recording light for detection may be properly selected depending on the application; for example, the recording light may be a light beam similar as that at recording or a light beam weaker than that at recording. When the light beam is weaker than that at recording, the irradiation energy is preferably 0.1 to 10,000 $\mu J/cm^2$, more preferably 1 to 1,000 $\mu J/cm^2$, particularly preferably 10 to 100 $\mu J/cm^2$. When the irradiation energy is below 0.1 $\mu J/cm^2$, the detection of the focus point may be insufficient, and when above 10,000 $\mu J/cm^2$, recording may occur unintentionally in the recording layer. The case, where the informing light or the reference light is a laser light, may be available to detect focusing length since no light interference occurs. When both of the informing light and the reference light are irradiated, they may be available for the detection provided that the irradiation energy is lowered into a level far from recording on optical recording media.

Unit to Record Interference Image

The unit to record an interference image decides the irradiating position of the recording light with respect to the position in thickness direction of the recording layer and the position in horizontal direction to layer plane of the recording layer, and displaces horizontally the recording light to the recording position to irradiate the recording layer and to form an interference image; and the interference image is recorded on the recording layer, in which multiple bits are recorded per one recording.

Irradiating Position of Recording Light in Thickness Direction

The irradiating position of the recording light in thickness direction is finely adjusted into just-pint by the tracking servo to coincide with the recording position of the hologram memory, and contains the recording position of the hologram memory; thus all of irradiating positions are maintained identical in terms of recording to the plane in parallel with layer plane of the recording layer. In cases where plural hologram memories are recorded in the thickness direction, when the first hologram memory is arranged to just-pint, for example, the recording light is irradiated so as to focus within the plane that contains the first hologram memory. When the second hologram memory is arranged to just-pint, the recording light is similarly irradiated so as to focus within the plane that contains the second hologram memory. Similarly, when nth memory is arranged to Just-pint, the recording light is irradiated in a similar manner.

In this way, the recording layer can undergo multiple-recording in thickness direction step-wise sequentially to achieve high multiple-recording.

Irradiating Position of Recording Light in Horizontal Direction

As regards the irradiating position of the recording light in horizontal direction, when the standard focus position of the hologram memory is defined as an original point, orthogonal X and Y axes are defined in a plane horizontal to the layer plane of the recording layer, and Z axis is defined in thickness direction of the recording layer, the standard focus position (0, 0, 0) of the original point is no more recordable since the hologram memory has been recorded already. Therefore, the irradiating position is defined at a position that is displaced from at least one of X and Y axes on the basis of the original point. When plural hologram memories are provided, the irradiating position is a position other than the positions of the hologram memories since the positions recorded in the hologram memories are non-writable. After the focus position of the recording light and the recording position of the hologram memory are adjusted to just-pint by the servo, the irradiating position in horizontal direction is displaced horizontally in parallel with layer plane of the recording layer and within the plane that contains the hologram memory, and the irradiation is carried out at a certain recording position.

Recording of Interference Image

The recording of the interference image is carried out in a way that the informing light and the reference light having a coherent property are irradiated to the recording layer, an interference image (interference fringe) is formed from the informing light and the reference light, and the interference image is recorded on the recording layer, in which multiple bits are recorded per one recording. The multiple bits are coded together with and formed as the interference image. That is, the interference image contains information of multiple bits, and multiple bits per one recording are recorded on a predetermined region of the recording layer. The unit to record the interference image may be those capable of recording a bright or dark interference fringe on a recording layer as the difference of refractive indices. The recording layer in the unit is formed from a photosensitive material such as photopolymers, and the bright portion of the interference fringe has a higher refractive index since the photosensitive material causes a polymerization reaction upon light irradiation, the dark portion generates no change in the refractive index since no reaction occurs, thus there arises a difference in their refractive indices.

The method to irradiate the informing light and the reference light may be properly selected depending on the application; for example, the reference light may be irradiated with a certain angle from the irradiating direction of the informing light, or the informing light and the reference light may be irradiated in a manner that the optical axis of the informing light and the optical axis of the reference light are coaxial. The term "coaxial" means that the informing light and the reference light pass through an identical optical system. The informing light and the reference light are irradiated at a recording portion of the recording layer of the optical recording medium with a certain angle thereby to carry out hologram recording.

Among these, preferable is the recording on the basis of so-called Collinear system where the optical axis of the informing light and the optical axis of the reference light are coaxial and thus high multiple-recording can be carried out and information transfer speed is higher.

A light source that can emit a laser light having a coherent property is used for the informing light and the reference light. Examples of the light source include solid laser oscillators, semiconductor laser oscillators, liquid laser oscillators, and gas laser oscillators. Among these, gas laser oscillators and semiconductor laser oscillators are preferable.

The laser light may be properly selected depending on the application; for example, a laser light having one or more wavelengths selected from 360 to 850 nm is employed. The wavelength is preferably 380 to 800 nm, more preferably 400 to 750 nm, most preferably 500 to 600 nm where the center of visible region is most viewable.

When the wavelength is below 360 nm, clear interference images may be unobtainable, and when above 850 nm, the interference fringes may come to finer and thus the corresponding adapted photosensitive materials may be unobtainable.

The irradiation energy of the laser light may be properly selected depending on the application; preferably, the irradiation energy is 0.1 to 10,000 $\mu J/cm^2$, more preferably 1 to 1,000 $\mu J/cm^2$, particularly preferably 10 to 100 $\mu J/cm^2$. When the irradiation energy is below 0.1 $\mu J/cm^2$, the recording may be impossible, and when above 10,000 $\mu J/cm^2$, recording may occur unintentionally.

Other Units

The other units are exemplified by units to fix an interference image. The unit to fix an interference image may be carried out for recorded portions after all recordings are completed, alternatively, the fixing may be carried out by irradiating a fixing light to the recorded portion every times after each of recordings.

Unit to Fix Interference Image

In the unit to fix an interference image, a fixing light is irradiated to fix the interference image that is recorded on the interference image by the unit to record the interference image. The irradiation of the fixing light is carried out on the region of the recorded interference images in an appropriate level, thereby the interference images can be efficiently fixed to enhance the storage stability, and optical recording media are obtainable that are free from problems such as noise upon reproduction.

Fixing Light

The irradiation region of the fixing light may be properly selected depending on the application; preferably, the irradiation region is the same as the region of the recording layer where the recording is carried out optionally by the informing light and the reference light or the region that is extended at least 1 $\mu m$ outward from the recorded portion. When the fixing light is irradiated to the region that is extended above 1 $\mu m$ outward from the recorded portion, the irradiation energy is excessive and inefficient since adjacent regions are irradiated.

The irradiation period of the fixing light may be properly selected depending on the application; preferably, the irradiation period is 1 ns to 100 ms at optional sites of the recording layer, more preferably 1 ns to 80 ms. When the irradiation period is shorter than 1 ns, the fixing may be insufficient, and when longer than 100 ms, the irradiation energy tends to be excessive. It is preferred that the irradiation of the fixing light is carried out within 28 hours after the interference image is recorded. When the irradiation of the fixing light is carried out after 28 hours from the recording of the interference image, the signal quality of previously recorded information may be degraded.

The irradiation direction of the fixing light may be properly selected depending on the application; for example, the irradiation direction at optional sites may be the same or different with the that of the informing light and the reference light. The irradiation angle is preferably 0° to 600 against the layer plane of the recording layer, more preferably 0° to 40°. The irradiation angles other than the range of the angle may lead to inefficient fixing.

The wavelength of the fixing light may be properly selected depending on the application; preferably, the wavelength at optional sites is 350 to 850 nm, more preferably 400 to 600 nm.

The wavelengths shorter than 350 nm may lead to degradation of materials, and the wavelengths longer than 850 nm may deteriorate materials due to higher temperatures.

The light source of the fixing light may be properly selected depending on the application; preferably, the light source is similar as those of the informing light and the reference light in order to avoid unnecessary additional devices. The light source, similar as those of the informing light and the reference light, may be used by way of irradiating the light emitted from the light source. When the same light source is used, the recording areas of interference images and irradiation areas of the fixing light can be easily conformed, and the fixing light can be efficiently irradiated.

The irradiation level of the fixing light may be properly selected depending on the application; preferably the irradiation level is 0.001 to 100 $mJ/cm^2$ at optional sites of the recording layer, more preferably 0.01 to 10 $mJ/cm^2$.

The method to irradiate the fixing light may be properly selected depending on the application; preferably, the irradiation is carried out to optional sites of the recording layer from the same light source as that of the informing light and the reference light. In some cases, the irradiation may be carried out using a light emitted from other light sources.

The servo unit and the unit to record an interference image are carried out for every plural hologram memories that are recorded on the recording layer with a predetermined interval in thickness direction, as shown in the follow chart of FIG. 1, that is, are carried out for every planes in parallel with layer plane of the recording layer that contain the hologram memories. For example, when the tracking servo is carried out for the first hologram memory, the tracking servo is carried out for the second hologram memory after the recording is completed on the plane containing the first hologram memory, then recording is carried out on the plane containing the second hologram memory.

On the other hand, for example, the subsequent recording can be carried out on the plane containing the second hologram memory if necessary, even when the recording is not completely finished for the same plane.

Multiple recording can be carried out in thickness direction by way of displacing the focus position to thickness direction of the recording layer in series. In such cases, it is preferred for the recording order that the recording is carried out initially on the plane that contains the deepest site of the recording layer along the progressing direction of the recording light, then the recording is carried out on the plane that contains the hologram memory disposed upstream side (incident side of recording layer) with an interval from the first hologram memory.

The reason why multiple recording can be carried out in thickness direction of the recording layer is that the recording light converges and focuses by action of objective lenses as shown in FIG. 3, and the record by use of the recording light is carried out in a condition that the apical end has the highest energy. It is therefore designed that the interference image is formed at around the apical end of the recording light; the energy is lower as departing from the apical end. The portions of the recording layer, where the energy being lowered, are not cured entirely by the irradiation of the recording light and remain as the layer capable of being recorded.

As shown in FIG. 3, the recording portion can be shifted to thickness direction of the recording layer, and upper portions of recorded portions can be recorded; as shown in FIG. 4, multiple recording can be carried out in thickness direction of the recording layer as well as plane direction horizontal to the layer plane. FIG. 5 exemplarily shows three hologram memories disposed in thickness direction of the recording layer; when the hologram memories are increased to four or more in the same optical recording medium, the recording capacity can increase proportionally.

Optical Recording Medium

The inventive optical recording medium comprises a recording layer, which records information by use of holography, on a support; and the interference image, recorded on the recording layer, is fixed by the fixing light.

The inventive optical recording medium may be of relatively thin plane holograms to record two-dimensional information or volume holograms to record numerous information such as of stereo images, and the inventive optical recording medium may be of transmissive or reflective type. The recording mode of the hologram may be, for example, of amplitude hologram, phase hologram, brazed hologram, or complex amplitude hologram. Specifically, preferable are optical recording media of reflective type that are used for recording mode of Collinear system.

The optical recording medium comprises the recording layer, a first substrate, a second substrate, and other optional layers properly selected as required.

Recording Layer

Information may be recorded by use of holography on the recording layers; the materials for the recording layers are those capable of changing optical properties such as absorption index and refractive-index depending on intensity of radiation upon irradiation of electromagnetic wave having a certain wavelength.

The material of the optical recording layer may be properly selected depending on the purpose; examples thereof include (i) polymerizable photopolymers that cause a polymerization reaction upon irradiation, (ii) photorefractive materials that exhibit a photorefractive effect to modulate the refractive index by causing a spatial electric charge distribution upon irradiation, (iii) photochromic materials that modulate the refractive index by causing a molecular isomerization upon irradiation, (iv) inorganic materials such as lithium niobate and barium titanate, and (v) chalcogen materials.

The photopolymer of (i) described above may be properly selected depending on the purpose, for example, the photopolymer contains a monomer and a photoinitiator, and also other components such as a sensitizer and oligomer as required.

The photopolymer may be one described in, for example, "Photopolymer Handbook" (by Kogyo Chosakai Publishing Co., 1989), "Photopolymer Technology" (by The Nikkan Kogyo Shinbun, Ltd., 1989) and SPIE manuscript Vol. 3291 pp. 89-103 (1998). In addition, the photopolymers described in U.S. Pat. Nos. 5,759,721, 4,942,112, 4,959,284 and 6,221,536; WO 97/44714, WO 97/13183, WO 99/26112 and WO 97/13183; Japanese Patent Nos. 2880342, 2873126, 2849021, 3057082 and 3161230; and Japanese Unexamined Patent Publication Nos. 2001-316416 and 2000-275859 may also be available.

The method for changing optical properties by irradiating a recording light onto the photopolymer may be based on diffusion of low molecular weight components. A component may be added that diffuses toward the reverse direction with that of the polymerizing component in order to mitigate the volume change on polymerization, or a compound having an acid cleavage structure may be further added in addition to the polymer. When the recording layer is formed using a photopolymer that contains the low molecular weight component, a structure capable of sustaining liquid may be required in the recording layer. When a compound having the acid cleavage structure is added, the volume change may be controlled by compensating the expansion due to the cleavage and the constriction due to the polymer polymerization.

The monomer may be properly selected depending on the purpose; example thereof include radically polymerizable monomers having an unsaturated bond such as acrylic and methacrylic group and cationic polymerization monomers having an ether structure such as epoxy and oxetane ring. These monomers may be monofunctional or polyfunctional and may also be one utilizing a photo-crosslinking reaction.

Examples of the radically polymerizable monomers include acryloyl morpholine, phenoxyethylacrylate, isobornylacrylate, 2-hydroxypropylacrylate, 2-ethylhexylacrylate, 1,6-hexanediol diacrylate, tripropyleneglycol diacrylate, neopentylglycol PO modified diacrylate, 1,9-nonandiol diacrylate, hydroxylpivalic acid neopentylglycoldiacrylate, EO modified bisphenol A diacrylate, polyethyleneglycol diacrylate, pentaerythritol triacrylate, pentaerythritol tetraacrylate, pentaerythritol hexaacrylate, EO modified glycerol triacrylate, trimethylolpropane triacrylate, EO modified trimethylolpropane triacrylate, 2-naphtho-1-oxyethylacrylate, 2-carbazoyl-9-ylethylacrylate, (trimethylsilyloxy)dimethylsilyl propylacrylate, vinyl-1-naphthoate and N-vinylcarbazol.

Examples of the cationic polymerization monomers include bisphenol A epoxy resins, phenolnovolac epoxy resins, glycerol triglycidylether, 1,6-hexaneglycidylether, vinyltrimethoxysilane, 4-vinylphenyl trimethoxysilane, gamma-methacryloxy propyltriethoxysilane and compounds expressed by the Formulas (A) to (E) below. These may be used alone or in combination of two or more.

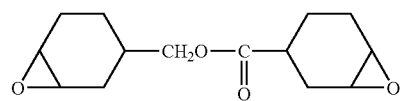

Formula (A)

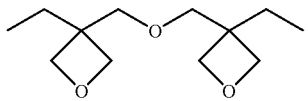

Formula (B)

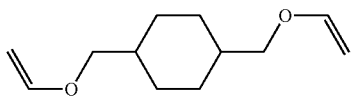

Formula (C)

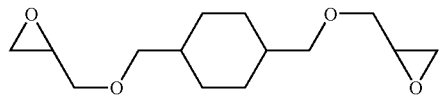

Formula (D)

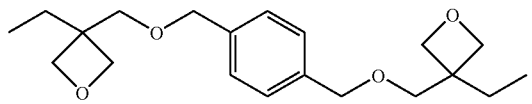

Formula (E)

The photoinitiator may be selected from materials sensitive to the recording light, for example, from those capable of inducing radical polymerization, cation polymerization, crosslinking reaction etc.

Examples of the photoinitiator include 2,2'-bis(o-chlorophenyl)-4,4',5,5'-tetraphenyl-1,1'-biimidazole, 2,4,6-tris(trichloromethyl)-1,3,5-triazine, 2,4-bis(trichloromethyl)-6-(p-methoxyphenylvinyl)-1,3,5-triazine, diphenyliodonium tetrafluoroborate, diphenyliodonium hexafluorophosphate, 4,4'-di-t-butyldiphenylodonium tetrafluoroborate, 4-diethylamino phenylbenzenediazonium hexafluorophosphate, benzoin, 2-hydroxy-2-methyl-1-phenylpropane-2-one, benzophenone, thioxanthone, 2,4,6-trimethylbenzoyldiphenylacyl phosphineoxide, triphenylbutylborate tetraethylammonium, and titanocene compounds expressed by the formulas below. These may be used alone or in combination of two or more, and may be combined with a sensitizing dye considering the wavelength of irradiating light.

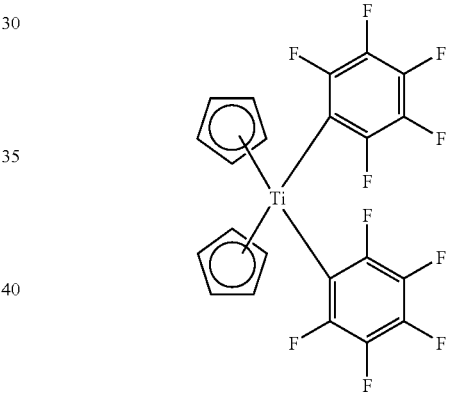

The photopolymer may be prepared by way of mixing and stirring to react the monomers, the photoinitiators, and optional other ingredients. In cases where the resulting photopolymer is of sufficiently lower viscosity, the recording layer may be made by casting processes; on the other hand, when the viscosity is excessively higher for the casting processes, the photopolymer is laid on a second substrate using a dispenser, then the second substrate is pressed onto the photopolymer similarly as lidding the first substrate onto the photopolymer to spread entirely thereby to form the recording layer.

The photorefractive material of (ii) described above may be properly selected depending on the purpose as long as the material exhibits the photorefractive effect; for example, the photorefractive material contains a charge generating material, a charge transporting material, and other ingredients as required.

The charge generating material may be properly selected depending on the purpose; examples thereof include phthalocyanine dyes/pigments such as metal phthalocyanines, non-metal phthalocyanines and derivatives thereof; naphthalocyanine dyes/pigments; azo dyes/pigments such as monoazo, disazo and triazo; perylene dyes/pigments; indigo dyes/pigments; quinacridone dyes/pigments; polycyclic quinone dyes/pigments such as anthraquinone and anthanthron; cyanine dyes/pigments; charge transfer complexes of electron acceptor substance and electron donor substance represented by TTF-TCNQ; azurenium salts; and fullerenes represented by $C_{60}$ and $C_{70}$ and methanofullerenes derived therefrom. These may be used alone or in combination of two or more.

The charge transporting material, which performs to transport holes or electrons, may be a low molecular weight or polymer compound.

The charge transporting material may be properly selected depending on the purpose; examples thereof include nitrogen-containing cyclic compounds such as indole, carbazole, oxazole, isooxazole, thiazole, imidazole, pyrazole, oxadiazole, pyrazoline, thiadiazole, triazole and derivatives thereof; hydrazone compounds; triphenyl amines, triphenyl methanes, butadienes; stilbenes; quinone compounds such as anthraquinone and diphenylquinone or the derivatives; fullerenes represented by $C_{60}$ and $C_{70}$ and derivatives thereof; pi-conjugated polymers or oligomers such as polyacetylene, polypyrrole, polythiophene and polyaniline; sigma-conjugated polymers or oligomers such as polysilane and polygerman; polycyclic aromatic compounds such as anthracene, pyrene, phenanthrene and coronene. These may be used alone or in combination of two or more.

As for the method for forming the recording layer using the photorefractive material, for example, a coating liquid is prepared by dissolving or dispersing the photorefractive material in to a solvent, a coating film is formed using the coating liquid, and removing the solvent from the coating film thereby to prepare the recording layer. Alternatively, the coating film may be formed from the photorefractive material which being liquidized by heating, the coating film is then rapidly cooled to form the recording layer.

The photochromic material of (iii) described above may properly selected depending on the purpose as long as the material is capable of causing a photochromic reaction; examples thereof include azobenzene compounds, stilbene compounds, indigo compounds, thioindigo compounds, spiropyran compounds, spirooxazine compounds, flukido compounds, anthracene compounds, hydrazone compounds and cinnamic compounds. Among these, particularly preferable are azobenzene derivatives and stilbene derivatives that undergo a structural change of cis-trans isomerization by light irradiation as well as spiropyran derivatives and spirooxazine derivatives that undergo a structural change of open or closed circular by light irradiation.

The chalcogen material (v) described above is, for example, a material that comprises a chalcogenide glass containing a chalcogen element and metal particles that is dispersed into the chalcogenide glass upon light irradiation.

The chalcogenide glass may be, without limitation, of nonoxidative amorphous material containing a chalcogen element of S, Te or Se and capable of optically doping the metal particles.

Examples of the aforementioned nonoxidative amorphous materials containing a chalcogen element include Ge—Se glasses, As—S glasses, As—Se glasses, and As—Se—Ce glasses; among these, Ge—Se glasses are preferable. When the Ge—Se glasses are employed as the chalcogenide glass, the composition ratio of Ge/S may be optionally arranged depending on the wavelength of irradiated light; preferably, the chalcogenide glass has a composition expressed mainly by $GeS_2$.

The aforementioned metal particles may be properly selected depending on the purpose from those having the property to be optically doped into the chalcogenide glass by light irradiation; examples thereof include Al, Au, Cu, Cr, Ni, Pt, Sn, In, Pd, Ti, Fe, Ta, W, Zn and Ag. Among these, Ag, Au and Cu are preferable due to their tendency of optical doping, particularly preferable is Ag due to remarkable tendency to cause the optical doping.

The content of the metal particles dispersed into the chalcogenide glass is preferably 0.1% by volume to 2% by volume based on the entire volume of the recording layer, more preferably 0.1% by volume to 1.0% by volume. When the content of the metal particles is less than 0.1% by volume, the accuracy of the recording may be low due to insufficient transmissivity change by the optical doping, and when above 2% by volume, the optical doping hardly occurs in a sufficient level due to lowered optical transmissivity of the recording material.

The recording layer may be properly selected from conventional processes depending on the material; the preferable processes for forming the layers are, for example, vapor deposition processes, wet film-forming processes, MBE (molecular beam epitaxy) processes, cluster ion beam processes, molecular laminating processes, LB processes, printing processes, and transfer processes. Among these, the vapor deposition processes and wet film-forming processes are preferable.

The vapor deposition process may be properly selected depending on the purpose from conventional ones; specific examples thereof include vacuum vapor deposition processes, resistance heating vapor deposition processes, chemical vapor deposition processes, and physical vapor deposition processes. The chemical vapor deposition process is exemplified more specifically by plasma CVD processes, laser CVD processes, heat CVD processes, and gas source CVD processes.

The recording layer may be formed by a wet film forming process, for example, in a manner that materials for the recording layer are dissolved and/or dispersed in a solvent to form a coating solution, then the coating solution is applied and dried. The wet film forming process may be properly selected depending on the purpose from conventional ones; examples thereof include ink jet processes, spin coating processes, kneader coating processes, bar coating processes, blade coating processes, casting processes, dipping processes, and curtain coating processes.

The thickness of the recording layer may be properly selected depending on the purpose; the thickness is preferably 1 μm to 1000 μm, more preferably 100 μm to 700 μm.

When the thickness of the recording layer is within the preferable range, the sufficient S/N ratio may be attained even on the shift multiplex of 10 to 300; and the more preferable range may advantageously lead to more significant effect thereof.

First Substrate

The first substrate may be properly selected in terms of shape, configuration, size etc. depending on the purpose; the shape may be disc, card etc.; the materials are required to assure the mechanical strength of the optical recording media. In the case that the light for recording or reproducing is directed through the substrate, it is necessary that the substrate is sufficiently transparent at the wavelength region of the employed light.

The material of the first substrate is usually selected from glasses, ceramics, resins etc.; preferably, resins are employed in particular from the view point of formability and cost.

Examples of the resins include polycarbonate resins, acrylic resins, epoxy resins, polystyrene resins, acrylonitrile-styrene copolymers, polyethylene resins, polypropylene resins, silicone resins, fluorine resins, ABS resins, and urethane resins. Among these, polycarbonate resins and acrylic resins are most preferable in view of their formability, optical characteristics, and costs. The first substrate may be appropriately prepared or commercially available.

The thickness of the first substrate may be properly selected depending on the application; the thickness is preferably 0.1 to 5 mm, more preferably 0.3 to 2 mm. When the thickness of the substrate is less than 0.1 mm, the optical disc may be deformed during its storage; and when the thickness is more than 5 mm, the weight of the optical disc may be as heavy as over-loading on drive motors.

Second Substrate

The second substrate may be identical or different from the first substrate with respect to the shape, configuration, size, material, and thickness. It is preferred in particular that the shape and size of the second substrate are identical with those of the first substrate. A reflective film is formed at the side that contacts with the recording layer of the second substrate.

Reflective Film

The reflective film is formed in order that the informing light and the reference light or the reproduction light are irradiated to focus at the reflective film and the informing light and the reference light or the reproduction light are reflected at the reflective film.

The material of the reflective film may be properly selected depending on the application; for example, such materials are preferable that provide the recording light and the reference light with high reflectivity. When the wavelength of light is 400 to 780 nm, Al, Al alloys, Ag, Ag alloys and the like are preferably used. When the wavelength of light is 650 nm or more, Al, Al alloys, Ag, Ag alloys, Au, Cu alloys, TiN and the like are preferably used.

The process for forming the reflective film may be properly selected depending on the application; examples thereof include various vapor deposition processes such as vacuum vapor deposition, sputtering, plasma CVD, photo CVD, ion plating, and electron beam vapor deposition processes. Among these, sputtering processes are most preferable in view of mass productivity, film quality, and the like. The thickness of the reflective film is preferably no less than 50 nm, more preferably no less than 100 nm, in order to achieve sufficient reflectance.

Other Layer

The other layers described above may be properly selected depending on the purpose; examples thereof include gap layers.

Gap Layer

The gap layer is provided between the recording layer and the reflective film as required for smoothing the surface of the second substrate. Moreover, the first gap layer is effective to adjust the size of the hologram formed in the recording layer. Specifically, the gap layer between the recording layer and the servo pit pattern may be effective, since the recording layer requires the interference region of some larger size between the recording/reference light and the informing light.

The gap layer can be formed by, for example, applying UV curable resin etc. on the servo pit pattern by spin coating etc. and by curing the resin. The thickness of the gap layer may be properly selected depending on the purpose; the thickness is preferably 1 μm to 200 μm.

The specific embodiments of the optical recording media according to the present invention will be explained more specifically with reference to figures.

SPECIFIC EXAMPLES OF EMBODIMENT

FIG. 2 is a schematic cross-sectional view showing configuration of a specific example of the optical recording medium 23 of an inventive embodiment. In the optical recording medium 23 according to the first embodiment, the surface of the substrate 1 made of polycarbonate resin or glass is coated with Al, Au, Pt or the like to form a reflective film 2.

When the gap layer is formed in the specific example of the embodiment, the gap layer may be formed by applying a UV curable resin or the like on the reflective film 2 of the second substrate 1 by spin coating or the like. The gap layer is effective for protecting the reflective film 2 and also for adjusting the size of holograms created in recording layer 4. Specifically, the interference region between the recording/reference light and the informing light requires a level of size in the recording layer 4, the gap layer is effectively provided between the recording layer 4 and the reflective film 2.

The recording layer 4 is laminated on the gap layer, and the recording layer 4 is sandwiched between the first substrate 5 (polycarbonate resin or glass substrate) and the second substrate 1 thereby to constitute the optical recording medium 23.

As shown in FIGS. 2, 6 and 7, hologram memories 3 that contain track information and address information are recorded radially at equal intervals in radial and circumferential directions on the recording layer 4 of the optical recording medium 23.

In the optical recording medium 23 of the specific example of this embodiment, the thickness of the second substrate 1 is 0.6 mm, the thickness of the recording layer 4 is 0.6 mm, the thickness of the first substrate 5 is 0.6 mm, and the total thickness is about 1.8 mm. When the gap layer is formed on the reflective film 2, the thickness of the gap layer is preferably 100 μm.

Optical operation around the optical recording medium 23 of the specific example of this embodiment will be explained with reference to FIGS. 1 and 8 in the following. As shown in FIG. 1, the recording light is initially irradiated to the optical recording medium 23, of which the recording layer being recorded the hologram memory, the diffracted light is received from the hologram memory, coincidence of the focus position of the recording light is judged with the standard focus position in the hologram memory, and servo is performed in the order of tracking servo and focus servo in terms of the focus positions; when the coincidence is achieved, the displaced distance is detected, and also a maximum deviation distance ΔLmax and an average deviation distance may be detected. When the maximum deviation distance ΔLmax is obtained, the recording light may be corrected for the irradiation position and irradiated to the optical recording medium to record and fix.

Figure 8:
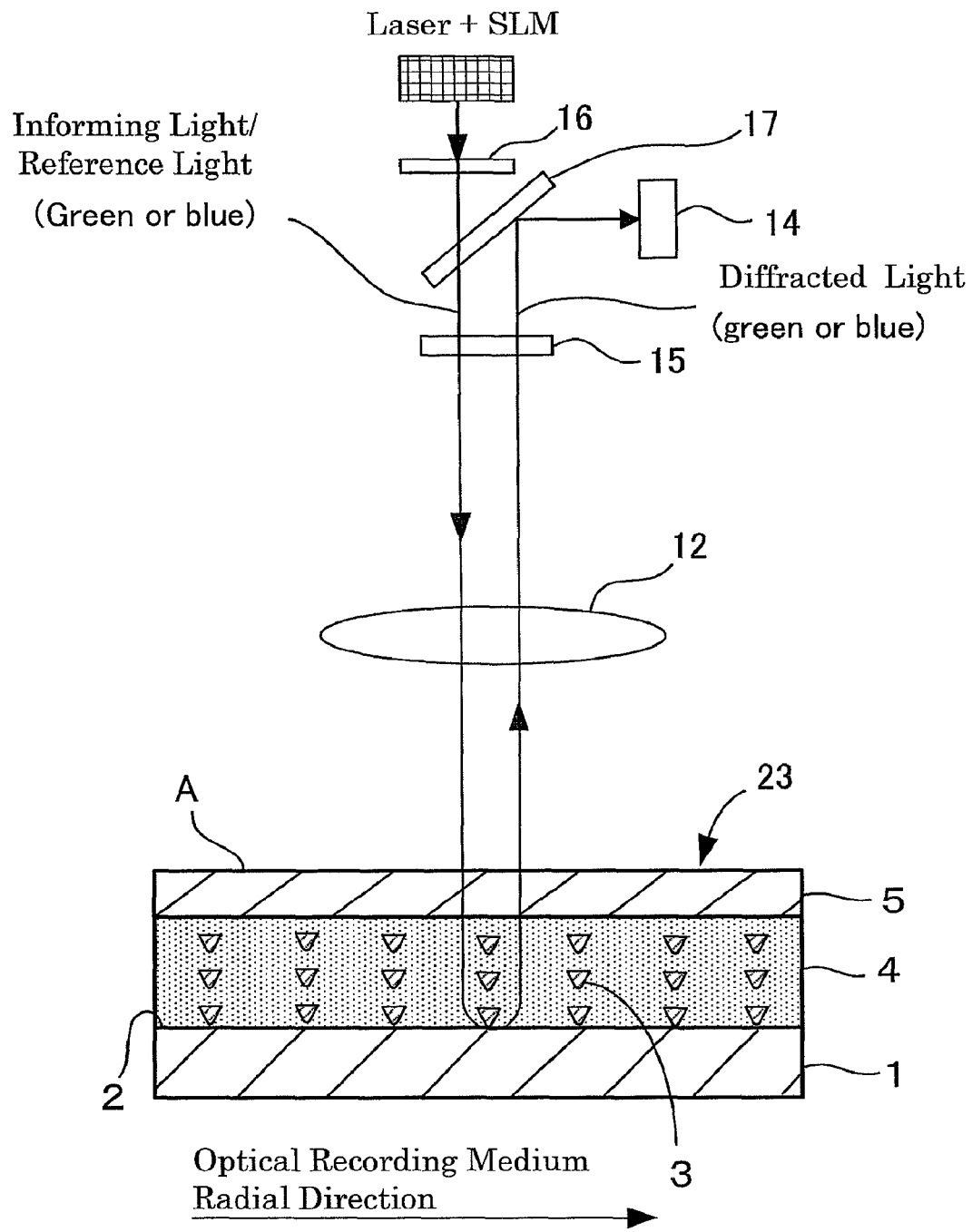
FIG. 8 is an exemplary view that explains an optical system around the inventive optical recording medium.

Specifically, as shown in FIG. 8, the informing light and the reference light are irradiated to the optical recording medium 23 so as to focus on the reflective film 2 by action of the objective lens 12 thereby to detect the deviation distance. Initially, the informing light and the reference light, emitted from a recording/reproducing laser source and treated with a spatial light modulator (SLM), pass through the polarizing plate 16 to form a linear polarization then to form a circular polarization after passing through a half mirror 17 and a quarter wave plate 15. The informing light and the reference light pass through the objective lens 12, enter from a light entrance/exit surface A of the optical recording medium 23, and pass through the first substrate 5 and the recording layer 4, irradiate the hologram memory 3 in the recording layer 4, a diffracted light generates from the hologram memory, and the diffracted light and a diffracted light reflected at the reflective film 2 pass again through the recording layer 4 and the first substrate 5 to emit from the light entrance/exit surface A.

The emitted diffracted light passes through the objective lens 12 and then a servo information detector (not shown)

detects the servo information. The detected servo information is used for the focus servo, tracking servo, slide servo and the like, and the unit to detect the deviation distance detects the deviation distance between the focusing length of the informing light and the reference light and the standard focus position recorded on the hologram memory 3.

The hologram materials of the recording layer 4 may be non-photosensitive for the irradiation of the informing light and the reference light since the intensity of the laser light for the informing light and the reference light is sufficiently weak. The design is therefore such that the recording layer 4 undergoes substantially no influence even when the informing light and the reference light reflect diffusely at the reflective film 2.

The unit to record an interference image performs a predetermined correction on the basis of the detected deviation distance, the offset of focusing length is appropriately performed, and also the irradiating position is displaced to a recording position other than the position of the hologram memory, for example, to the recording region 36 of FIG. 6, then the recording light is irradiated to the recording region 36 of the recording layer 4 to record as follows.

Initially, the informing light and the reference light, emitted from a recording/reproducing laser source and treated with a spatial light modulator, pass through the polarizing plate 16 to form a linear polarization then to form a circular polarization after passing through a half mirror 17 and a quarter wave plate 15, similarly as at detecting. The informing light and the reference light pass through the objective lens 12, enter from a light entrance/exit surface A of the optical recording medium 23, and pass through the first substrate 5 and the recording layer 4, and interfere each other at the recording layer 4 to generate an interference image to record the interference image on the recording layer 4. Then the informing light and the recording/reference light pass through the recording layer and are reflected at the reflective film 2 to form a return light. The reflective film is flat without projections like servo pit patterns, thus the informing light and the recording/reference light are reflected to turn into the return light without diffused reflection to provide normal recording.

Fixing of Recording

A fixing light is irradiated to the recorded region within 28 hours after the interference image is recorded on the recording layer 4 thereby to fix the recording of the interference image.

Optical Reproducing Method

In the inventive optical reproducing method, the interference image, recorded on the recording layer 4 by the inventive optical recording method, is irradiated by the reproducing reference light (reproduction light) to reproduce the information. In order to irradiate the reference light to the interference image recorded on the recording layer 4, the objective lens 12 is finely adjusted, as shown in FIG. 8, and the focus of the reference light is set at the position where the interference image is recorded at the recording layer 4 and the irradiation is carried out. A diffracted light generates from the interference image upon the irradiation, the diffracted light transmits through the objective lens 12, dichroic mirror 13, and quarter wave plate 15, then is reflected at the half mirror 17, and the information is reproduced from the diffracted light by the detector 14.

In the optical recording method and the optical reproducing method according to the present invention, the informing light with a two-dimensional intensity distribution and the reference light with almost the same intensity to that of the informing light are superimposed inside the photosensitive recording layer, the resulting interference image formed inside the recording layer induces a distribution of the optical properties of the recording layer there to record such distribution as information. On the other hand, when the recorded information is to be read (reproduced), only the reference light is irradiated onto the recording layer under a similar configuration at the time of recording, a light having an intensity distribution corresponding to the distribution of the optical property formed inside the recording layer is emitted from the recording layer as a reproducing light.

The optical recording method and the optical reproducing method according to the present invention may be carried out by use of the optical recording and reproducing apparatus according to the present invention explained below.

The optical recording and reproducing apparatuses applied to the optical recording method and the optical reproducing method in relation to the present invention will be explained with reference to FIG. 9.

Figure 9:
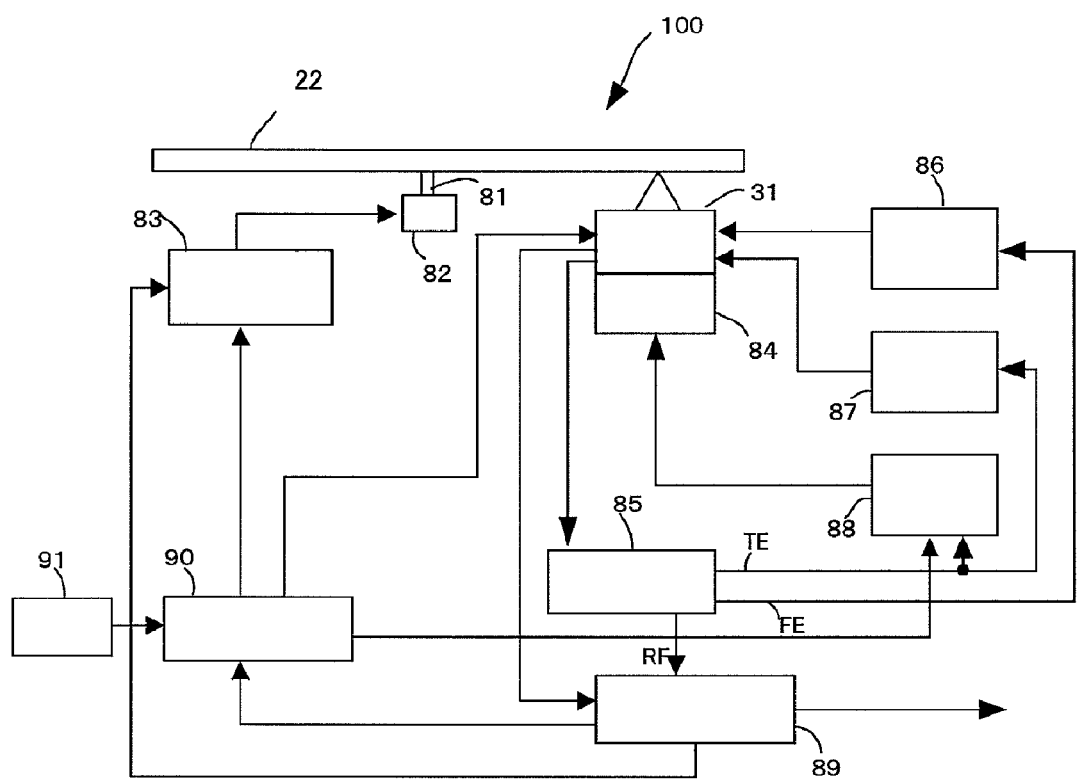
FIG. 9 is a block diagram that shows exemplarily an entire construction of the inventive optical recording and reproducing apparatus.

FIG. 9 is an overall structural view of an optical recording and reproducing apparatus in accordance with an inventive embodiment. The optical recording and reproducing apparatus contains an optical recording apparatus and an optical reproducing apparatus This optical recording and reproducing apparatus 100 is equipped with spindle 81 on which the optical recording medium 22 is disposed, spindle motor 82 that rotates the spindle 81, and spindle servo circuit 83 that controls the spindle motor 82 so as to maintain the optical recording medium at the predetermined revolution number.

The optical recording and reproducing apparatus 100 is also equipped with a pickup 31 that irradiates the informing light and the reference light onto the optical recording medium 22 so as to record information, and irradiates the reproducing reference light onto the optical recording medium so as to detect the diffracted light to thereby reproduce the information recorded at the optical recording medium 22, and driving unit 84 that enables the pickup 31 to move in the radius direction of optical recording medium.

The optical recording and reproducing apparatus 100 is equipped with detecting circuit 85 that detects focusing error signal FE, tracking error signal TE, and reproducing signal RF from the output signal of the pickup 31, focusing servo circuit 86 that drives an actuator in the pickup 31 so as to move an objective lens (not shown) to the thickness direction of the optical recording medium 22 based upon the focusing error signal FE detected by the detecting circuit 85 to thereby perform focusing servo, a tracking servo circuit 87 that drives an actuator in the pickup 31 so as to move an objective lens (not shown) to the thickness direction of the optical recording medium based upon the tracking error signal TE detected by the detecting circuit 85 to thereby perform tracking servo, and a sliding servo circuit 88 that controls the driving unit 84 based upon the tracking error signal TE and an indication from a controller mentioned hereinafter so as to move the pickup 31 to the radius direction of the optical recording medium 22 to thereby perform sliding servo.

The optical recording and reproducing apparatus 100 is also equipped with signal processing circuit 89 that decodes output data of the CMOS or CCD array described below in the pickup 31, to thereby reproduce the data recorded in the data area of the optical recording medium, and to reproduce the standard clock or to determine the address based on the reproducing signal RF from the detecting circuit 85, controller 90 that controls the whole optical recording and reproducing apparatus 100, and controlling unit 91 that gives various instructions to the controller 90.

The controller 90 is configured to input the standard clock or address information outputted from the signal processing circuit 89 as well as controlling the pickup 31, the spindle servo circuit 83, the sliding servo circuit 88 and the like. The spindle servo circuit 83 is configured to input the standard clock outputted from the signal processing circuit 89. The controller 90 contains CPU (center processing unit), ROM (read only memory), and RAM (random access memory), the CPU realizes the function of the controller 90 by executing programs of the RAM as a working area stored in the ROM.

The optical recording and reproducing apparatus, which being used for the optical recording method and the optical reproducing method according to the present invention, can record or reproduce information or perform focus or tracking control by use of the informing light and the reference light; the efficiency of the recording and reproducing is higher, and high density recording as well as high multiple-recording can be attained without undergoing influence of the deviation of optical axes of plural laser lights induced from accident errors of optical recording and optical reproducing apparatuses. In addition, excellent optical recording media, of which the layer construction is simple, can be obtained.

EXAMPLES

The present invention will be explained with reference to examples, but it should be understood that the present invention is not limited thereto at all.

Example 1

An optical recording medium can be produced in order to carry out the inventive optical recording method.
Production of Optical Recording Medium The resulting optical recording medium may comprise a first substrate, a second substrate, and a recording layer.

The second substrate may be a conventional polycarbonate resin substrate used for DVD+RW of diameter 120 mm and board thickness 0.6 mm. A reflective film is formed on the surface of the substrate. The material of the reflective film may be aluminum (Al).

An Al reflective film of 200 nm thick is formed by a DC magnetron sputtering process. A polycarbonate film of 100 μm thick is used as a gap layer on the reflective film and may be adhered by a UV curable resin.

The photopolymer coating liquid of the ingredients below may be prepared as the material of the recording layer.

| Ingredients of Photopolymer Coating Liquid | |
| --- | --- |
| di(urethaneacrylate) oligomer *[1] | 59 parts by mass |
| isobornyl acrylate | 30 parts by mass |
| vinyl benzoate | 10 parts by mass |
| polymerization initiator *[2] | 1 part by mass |

*[1] by Echo Resins Co., ALU-351
*[2] by Ciba Specialty Chemicals, Co., Irgacure 784

The resulting photopolymer coating liquid is laid on a second substrate using a dispenser, then a first substrate of a polycarbonate resin of diameter 12 cm and thickness 0.6 mm is pressed to the photopolymer, thereby a disc edge and the first substrate may be laminated by an adhesive.

A flange portion is provided at the disc edge in order to adjust the thickness of the photopolymer layer to 500 μm, and the thickness of the polymer layer may be defined by adhering the first substrate to the disc edge and removing the excessive photopolymer to overflow. Consequently, the optical recording medium of Example 1 may be prepared. FIG. 2 is a schematic cross-sectional view that shows a configuration similar as this Example.

Recording of Hologram Memory on Optical Recording Medium

The recording of hologram memory on the optical recording medium is carried out, as shown in FIG. 8, in a way that the informing light and recording/reference light are irradiated to the recording layer 4 formed in the optical recording medium 23 at an irradiation energy of about 50 mJ/cm$^2$ for 100 nsec to form data in terms of tracking information, address information, and focusing length information as an interference image, the interference image is recorded on the recording layer 4, thereby a hologram memory 3 may be obtained.

As regards the recording position of the hologram memory 3, as shown in FIG. 8, the first hologram memory 3 is recorded around the interface with the second substrate in thickness direction of the recording layer 4, the second hologram memory 3 is recorded at central portion of the thickness direction, and the third hologram memory 3 is recorded at around the interface with the first substrate in thickness direction of the first substrate, in a way that the respective interference fringes are formed and the interference fringes may be recorded as interference images.

Recording on Recording Layer

An informing light of wavelength 532 nm is irradiated to the portion of the first hologram memory of the optical recording medium 23 at an irradiation energy of no more than 50 mJ/cm$^2$ at which substantially no recording occurs, the reflected light is generated, the reflected light is received, the recording light is subjected to tracking servo to the just-pint position on the basis of the track information, the recording light is then subjected to focus servo on the basis of the (first servo step), the address of the optical axis of the recording light is detected, and the optical axis of the recording light may be displaced to a certain position other than the position of the hologram memory in order to realize the position to perform recording.

The irradiation of the recording layer is carried out, as shown in FIG. 8, in a way that the informing light and the recording/reference light are irradiated to the recording layer 4 at an irradiation energy of about 50 mJ/cm$^2$ for 100 nsec to form an interference image, and the interference image may be recorded on the recording layer (first step of recording an interference image).

Then the servo, same as the servo performed to the first hologram memory 3, is also performed to the second hologram memory 3 (second servo step), the second interference image is formed through light irradiation, and the second interference image may be recorded and fixed (second step of recording an interference image).

Furthermore, the servo, same as the servo performed to the first hologram memory 3, is also performed to the third hologram memory 3 (third servo step), the third interference image is formed through light irradiation, and the third interference image may be recorded and fixed (third step of recording an interference image).

As shown in FIG. 5, multiple recording of three layers may be carried out on the recording layer 4 in thickness direction of the recording layer 4 on the basis of the first to the third hologram memories 3. The multiple recording in the thickness direction can bring about remarkable increase of recording capacity as optical recording media.

Evaluation of Quality to Reproduce Recording

The evaluation of the quality to reproduce the recording is carried out by the optical recording and reproducing apparatus 100 shown in FIG. 9 in a way of irradiating the reference light to the optical recording medium, generating a diffracted light from the interference image, reading it by a detector 14 shown in FIG. 8, and reproducing the original information, consequently, it may be confirmed whether errors (number/frame) are few.

Comparative Example 1

Plural laser lights were used in Comparative Example 1, i.e. a laser light of wavelength 650 nm was used as the servo light, and a laser light of wavelength 532 nm was used as the recording light.

Production of Filter for Optical Recording Medium

A base film is prepared by way of coating a polyvinyl alcohol (by Kuraray Co., product name: MP203) is coated to a thickness of 1 µm on a polycarbonate film (Mitsubishi Gas Chemical Co., product name: Upilon) of 100 µm thick. The side of the polyvinyl alcohol may be subjected to rubbing by passing the base film through a rubbing device to afford a capability to orient liquid crystal.

Coating liquids A, B and C for cholesteric liquid crystal layer of the ingredients shown in Table 1 below may be produced by a conventional process.

TABLE 1

| Ingredient | coating liquid for cholesteric liquid crystal layer | | |
|---|---|---|---|
| (part by mass) | A | B | C |
| UV polymerizable Liquid crystal *[1] | 93.16 | 94.02 | 94.74 |
| chiral agent *[2] | 6.84 | 5.98 | 5.26 |
| photopolymerization initiator *[3] | 0.10 | 0.10 | 0.10 |
| sensitizer *[4] | 0.02 | 0.02 | 0.02 |
| solvent *[5] | 400 | 400 | 400 |

*[1] by BASF Co., product name: PALIOCOLOR LC242
*[2] by BASF Co., product name: PALIOCOLOR LC756
*[3] by Ciba Specialty Chemicals, Co., product name: Irgacure 369
*[4] diethylthioxanthone
*[5] methyl ethyl ketone (MEK)

Then the coating liquid for cholesteric liquid crystal layer A was coated on the base film using a bar coater, and the coating was dried, followed by being aged to orient at 110° C. for 20 seconds. Then the coating is exposed to an irradiation energy of 500 mJ/cm$^2$ at 110° C. using a super high pressure mercury lamp, thereby a cured film of cholesteric liquid crystal layer A of 2 µm thick may be formed.

Then the coating liquid for cholesteric liquid crystal layer B may be coated on the cholesteric liquid crystal layer A using a bar coater, followed by drying the coating, then the coating can be aged to orient at 110° C. for 20 seconds. Then the coating is exposed to an irradiation energy of 500 mJ/cm$^2$ at 110° C. using a super high pressure mercury lamp, thereby a cured film of cholesteric liquid crystal layer B of 2 µm thick may be formed.

Then the coating liquid for cholesteric liquid crystal layer C may be coated on the cholesteric liquid crystal layer B using a bar coater, followed by drying the coating, then the coating can be aged to orient at 110° C. for 20 seconds. Then the coating is exposed to an irradiation energy of 500 mJ/cm$^2$ at 110° C. using a super high pressure mercury lamp, thereby a cured film of cholesteric liquid crystal layer C of 2 µm thick may be formed.

Consequently, a filter for optical recording media of Comparative Example 1 of three-layer configuration that has a circular polarization separating ability may be produced, in which the cholesteric liquid crystal layers have different selective-reflection central wavelengths each other, and the rotation direction of spiral is right-handed equally for all of the cholesteric liquid crystals.

Production of Optical Recording Medium

An optical recording medium may be produced that is formed from a first substrate, a second substrate, a recording layer, and a filter layer.

As regards the second substrate, a conventional substrate of polycarbonate resin may be used that has a diameter of 120 mm and a board thickness of 0.6 mm and is used for DVD+RW. The entire surface of the substrate is provided with a servo pit pattern having a track pitch of 0.74 µm, a groove depth of 175 nm, and a groove width of 300 nm.

Initially, a reflective film is formed on the surface of the servo pit pattern of the second substrate. The reflective material was aluminum (Al). The film is formed by a DC magnetron spattering process to form an Al reflective film of 200 nm thick. A polycarbonate film of 100 µm thick may be provided and adhered to the reflective film as a first gap layer using a UV curable resin.

Then the resulting filter for optical recording media is cut through into a certain disc size to dispose on the substrate, and the side of the base film may be laminated to the side of the servo pit pattern. The laminating is carried out using UV curable resins or adhesives to prevent inclusion of bubbles. Consequently, a filter layer may be formed.

The materials of the recording layer are substantially the same as those of Example 1.

The resulting photopolymer coating liquid is laid on the filter layer using a dispenser, then the first substrate of polycarbonate resin of diameter 12 cm and thickness 0.6 mm is pressed to the photopolymer, thereby a disc edge and the first substrate may be laminated by an adhesive.

Figure 10:
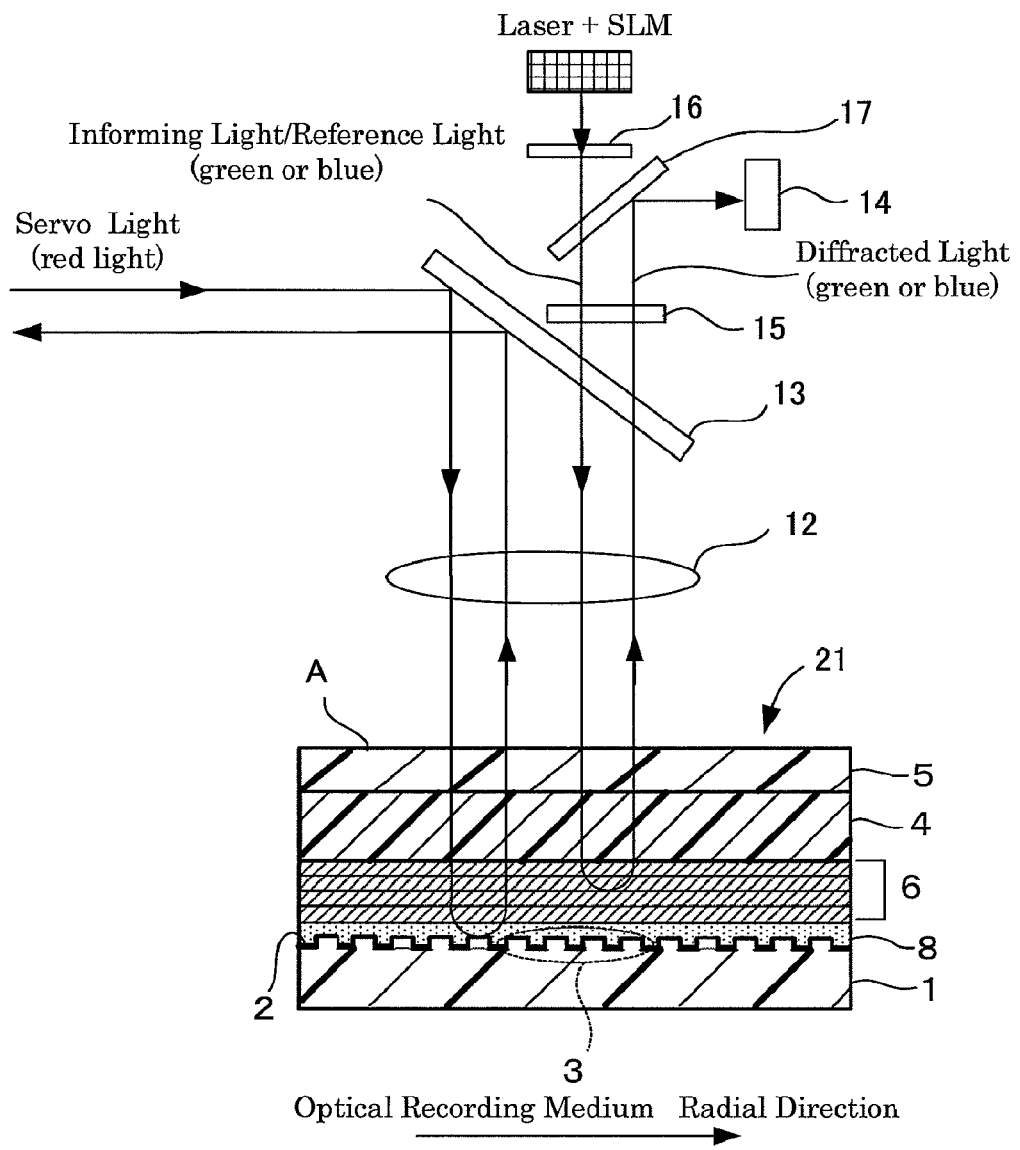
FIG. 10 is an exemplary view that explains an optical system around a conventional optical recording medium.

A flange portion is provided at the disc edge in order to adjust the thickness of the photopolymer layer to 500 µm, and the thickness of the photopolymer layer may be defined by adhering the first substrate to the disc edge and removing the excessive photopolymer to overflow. Consequently, the optical recording medium of Comparative Example 1 is prepared. FIG. 10 at lower portion thereof shows an optical recording medium 21, which is a schematic cross-sectional view that shows a configuration similar as this Comparative Example 1.

Recording on Recording Layer

The recording on the recording layer may be carried out, as shown in FIG. 10, in a way that the informing light and the recording/reference light are irradiated to the recording layer 4 at an irradiation energy of about 50 µJ/cm$^2$ for 100 nsec to form an interference image, thereby the interference image may be recorded on the recording layer.

Selective Reflection Property of Optical Recording Medium

The resulting optical recording media may be measured for optical reflection properties using a spectral reflection meter (light source: L-5662 by Hamamatsu Photonics K.K., photomultichannel analyzer: PMA-11 by Hamamatsu Photonics K.K.).

A laser light of wavelength 532 nm, which being converted to a linearly-polarized laser light by a polarizing element 16 and then to a right-handed circular light by a quarter wave plate 15, is irradiated to the resulting optical recording media as the informing light and the reference light, as shown in FIG. 10, and a laser light of wavelength 650 nm is irradiated as the servo light. As a result, it may be confirmed that the servo light is reflected at the reflective plate 2.

Evaluation of Quality to Reproduce Recording

The evaluation of the quality to reproduce the recording is carried out by the optical recording and reproducing apparatus 100 shown in FIG. 9 in a way of irradiating the reference light to the optical recording media, generating a diffracted light from the interference image, and reading it by a detector 14 shown in FIG. 8, consequently, it may be confirmed whether errors (number/frame) are few.

It may be confirmed that the quality of recording and reproducing in Example 1 represents few errors in a degree equivalent to the quality of recording and reproducing in Comparative Example 1.

INDUSTRIAL APPLICABILITY

The optical recording method according to the present invention can record or reproduce information or perform focus or tracking control by use of a laser light at higher efficiency of recording and reproducing without being influenced by the deviation of optical axes of plural laser lights induced from accident errors of optical recording and optical reproducing apparatuses, and also the optical recording method according to the present invention is excellent in that simple layer construction of optical recording media themselves can be provided, thus is employed as optical recording methods of hologram type capable of highly multiple-recording.

The optical recording medium according to the present invention can exhibit higher efficiency of recording and reproducing when recording or reproducing information or performing focus or tracking control by use of laser light and can undergo no influence by the deviation of optical axes of plural laser lights induced from accident errors of optical recording and optical reproducing apparatuses, and high multiple-recording can be achieved, thus the optical recording medium according to the present invention can be widely used as excellent ones having a simple layer configuration themselves.

The invention claimed is:

1. An optical recording method, comprising:
a first step of recording an interference image, in which a recording light is irradiated to an optical recording medium that is provided with a recording layer to record information by use of holography, an interference image is formed, and the interference image is formed on the recording layer, wherein the recording light is irradiated at an optional focusing length X1 in thickness direction of the recording layer, and multiple bits are recorded per one recording, and
a second step of recording an interference image, in which the recording light is irradiated to form a second interference image, and the second interference image is formed and recorded on the recording layer, wherein the recording light is irradiated at a focusing length X2 that is different from the focusing length X1, and multiple bits are recorded per one recording,
wherein the optical recording medium comprises at least two hologram memories, which record focus position information with an interval in thickness direction of the recording layer, and the focus position information comprises at least one of track information, address information, and focusing length information that expresses a distance between a collecting lens and the focus point of the recording light,
wherein the optical recording method comprises:
a first servo step, in which the recording light is irradiated to a first hologram memory among the at least two hologram memories, the diffracted light from the first hologram memory is received, the recording light is subjected to tracking servo on the basis of the track information and the address information, and the recording light is subjected to focus servo on the basis of the focusing length information,
a first step of recording the interference image, in which the focus position of the recording light is displaced horizontally in parallel with layer plane of the recording layer and within the plane that contains the first hologram memory so as to place the focus position of the recording light to a position other than the first hologram memory, the recording light is irradiated to the recording layer to form the first interference image, and the first interference image is recorded on the recording layer,
a second servo step, in which the recording light is irradiated to a second hologram memory, which records with an interval between the first hologram memory in thickness direction of the recording layer, the diffracted light from the second hologram memory is received, the recording light is subjected to tracking servo on the basis of at least one of the track information and the address information, and the recording light is subjected to focus servo on the basis of the focusing length information, and
a second step of recording the interference image, in which the focus position of the recording light is displaced horizontally in parallel with layer plane of the recording layer and within the plane that contains the second hologram memory so as to place the focus position of the recording light to a position other than the second hologram memory, the recording light is irradiated to the recording layer to form the second interference image, and the second interference image is recorded on the recording layer.

2. The optical recording method according to claim 1, wherein the focusing length X1 is a distance at which the interference image is formed at interface of the recording layer, and the focusing length X2 is a distance at which the interference image is formed at a position other than the interface.

3. The optical recording method according to claim 1, wherein the method to detect the focus position in at least one of the first servo step and the second servo step comprises irradiating the recording light to the hologram memory, receiving the diffracted light, and detecting the position at which signal intensity of the diffracted light is maximum.

4. The optical recording method according to claim 1, wherein the method to detect the focus position in at least one of the first servo step and the second servo step comprises irradiating the recording light to the hologram memory, receiving the diffracted light, and detecting the position at which signal error of the diffracted light is minimum.

5. The optical recording method according to claim 1, wherein the optical recording medium comprises a first substrate, a recording layer, and a second substrate in this order.

6. The optical recording method according to claim 1, wherein the recording light is at least one of an informing light and a reference light, and the informing light and the reference light are irradiated to the optical recording medium in a way that the optical axis of the informing light and the optical axis of the reference light are coaxial.

7. An optical recording medium, recorded by the optical recording method according to claim 1, comprising a hologram memory that records on the recording layer at least two sets of focus position information with an interval in thickness direction of the recording layer, and each focus position information contains at least one of track information and address information as well as focusing length information that expresses a distance between a collecting lens and the focus point of the recording light.

8. An optical recording apparatus, comprising:

a first unit configured to record an interference image, in which a recording light is irradiated to an optical recording medium that is provided with a recording layer to record information by use of holography, an interference image is formed, and the interference image is formed on the recording layer, wherein the recording light is irradiated at an optional focusing length X1 in thickness direction of the recording layer, and multiple bits are recorded per one recording, and a second unit configured to record an interference image, in which the recording light is irradiated to form a second interference image, and the second interference image is formed and recorded on the recording layer, wherein the recording light is irradiated at a focusing length X2 that is different from the focusing length X1, and multiple bits are recorded per one recording, wherein the optical recording medium comprises at least two hologram memories, which record focus position information with an interval in thickness direction of the recording layer, and the focus position information comprises at least one of track information, address information, and focusing length information that expresses a distance between a collecting lens and the focus point of the recording light, wherein the optical recording apparatus comprises:

a first servo unit, in which the recording light is irradiated to a first hologram memory among the at least two hologram memories, the diffracted light from the first hologram memory is received, the recording light is subjected to tracking servo on the basis of at least one of the track information and the address information, and the recording light is subjected to focus servo on the basis of the focusing length information, a first unit configured to record the interference image, in which the focus position of the recording light is displaced horizontally in parallel with layer plane of the recording layer and within the plane that contains the first hologram memory so as to place the focus position of the recording light to a position other than the first hologram memory, the recording light is irradiated to the recording layer to form the first interference image, and the first interference image is recorded on the recording layer, a second servo unit, in which the recording light is irradiated to a second hologram memory, which records with an interval between the first hologram memory in thickness direction of the recording layer, the diffracted light from the second hologram memory is received, the recording light is subjected to tracking servo on the basis of the track information and the address information, and the recording light is subjected to focus servo on the basis of the focusing length information, and a second unit configured to record the interference image, in which the focus position of the recording light is displaced horizontally in parallel with layer plane of the recording layer and within the plane that contains the second hologram memory so as to place the focus position of the recording light to a position other than the second hologram memory, the recording light is irradiated to the recording layer to form the second interference image, and the second interference image is recorded on the recording layer.

9. The optical recording apparatus according to claim 8, wherein the focusing length X1 is a distance at which the interference image is formed at interface of the recording layer, and the focusing length X2 is a distance at which the interference image is formed at a position other than the interface.

* * * * *